United States Patent
Yan

(10) Patent No.: US 11,539,463 B2
(45) Date of Patent: Dec. 27, 2022

(54) METHODS AND COMPUTING DEVICE FOR FACILITATING MULTIPLE ACCESS IN A WIRELESS COMMUNICATION NETWORK

(71) Applicant: ZTE Corporation, Guangdong (CN)

(72) Inventor: Chunlin Yan, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/929,093

(22) Filed: Jul. 14, 2020

(65) Prior Publication Data
US 2020/0351019 A1 Nov. 5, 2020

Related U.S. Application Data

(63) Continuation of application No. PCT/CN2018/072577, filed on Jan. 15, 2018.

(51) Int. Cl.
*H04L 1/00* (2006.01)
*H04W 52/18* (2009.01)

(52) U.S. Cl.
CPC .......... *H04L 1/0071* (2013.01); *H04L 1/0056* (2013.01); *H04W 52/18* (2013.01)

(58) Field of Classification Search
None
See application file for complete search history.

(56) References Cited

U.S. PATENT DOCUMENTS

| | | | |
|---|---|---|---|
| 10,039,140 B2 | 7/2018 | Chae et al. | |
| 2004/0120424 A1 | 6/2004 | Roberts | |
| 2007/0149242 A1* | 6/2007 | Kim | H04L 27/2647 455/525 |
| 2010/0232542 A1* | 9/2010 | Miyoshi | H04L 27/2647 375/295 |
| 2012/0057703 A1 | 3/2012 | Hsuan et al. | |
| 2014/0281833 A1* | 9/2014 | Kroeger | H04H 20/30 714/776 |
| 2016/0197625 A1* | 7/2016 | Shinohara | H03M 13/1165 714/776 |
| 2018/0123765 A1* | 5/2018 | Cao | H04L 1/1893 |
| 2018/0337816 A1* | 11/2018 | Herath | H04L 1/0061 |
| 2018/0351681 A1* | 12/2018 | Ma | H04L 1/08 |
| 2019/0165827 A1* | 5/2019 | Churan | H04J 11/003 |

FOREIGN PATENT DOCUMENTS

| | | |
|---|---|---|
| CN | 1490961 A | 4/2004 |
| CN | 101083485 A | 12/2007 |
| CN | 101931453 A | 12/2010 |
| CN | 105379146 A | 3/2016 |

(Continued)

OTHER PUBLICATIONS

ETRI, "Low code rate and signature based multiple access scheme for New Radio," 3GPP TSG-RAN1#85, Nanjing, China, R1-164869, 4 pages, May 2016.

(Continued)

*Primary Examiner* — The Hy Nguyen
(74) *Attorney, Agent, or Firm* — Perkins Coie LLP

(57) ABSTRACT

According to various implementation, a wireless communication device applies a repetition code to a data stream; randomizes the data stream; multiplies the data stream by a random sequence; and transmits the data stream after the aforementioned signal processing as a wireless signal.

18 Claims, 25 Drawing Sheets

(56) References Cited

FOREIGN PATENT DOCUMENTS

CN  107070541 A  8/2017
CN  107171770 A  9/2017

OTHER PUBLICATIONS

International Search Report and Written Opinion dated Aug. 21, 2018 for International Application No. PCT/CN2018/072577, filed on Jan. 15, 2018 (6 pages).
NTT Docomo, Inc., "NOMA scheme with user grouping," 3GPP TSG RAN WG1 Meeting AH 1801, Vancouver, Canada, R1-1800686, 6 pages, Jan. 2018.
Mediatek Inc., "New uplink non-orthogonal multiple access schemes for NR," 3GPP TSG RAN WG1 Meeting #86, R1-167535, Gothenburg, Sweden, Aug. 22-26, 2016, 6 pages.
Kaur et al., "Performance Analysis of Random Multiple Access Protocols used in Wireless Communication," Proceedings of the 6th International Conference on Broadband Communications & Biomedical Applications, Nov. 21-24, 2011, Melbourne, Australia, 6 pages.
Yu, "Analysis and Suppression of Multiple Access Interference and Inter-cell Interference in Mobile Communication Systems," Information technology series, Jun. 1, 2010, 108 pages.

* cited by examiner

FIG. 5A

Multiplication of the BPSK modulation of FIG. 5A with a sequence

METHODS AND COMPUTING DEVICE FOR FACILITATING MULTIPLE ACCESS IN A WIRELESS COMMUNICATION NETWORK

CROSS-REFERENCE TO RELATED APPLICATION

This patent document is a continuation of and claims benefit of priority to International Patent Application No. PCT/CN2018/072577, filed on Jan. 15, 2018. The entire content of the aforementioned patent application is incorporated by reference as part of the disclosure of this patent document.

TECHNICAL FIELD

The present disclosure is related generally to wireless networks and, more particularly, to methods and a computing device for facilitating multiple access in a wireless communication network.

BACKGROUND

Wireless communication devices that use spreading-based non-orthogonal multiple access (NOMA) schemes typically use a minimum mean square error successive interference cancellation (MMSE-SIC) receiver for signal detection. To achieve optimum performance, there is a requirement for an un-equal Signal to Interference plus Noise Ratio (SINR) distribution. The user signal with the highest SINR is detected first and its interference is canceled, and the following users' signals can be detected and decoded successfully with high probability. Thus, in an Additive white Gaussian noise (AWGN) channel, the performance of a spreading based scheme is not as good due to the fact that un-equal SINR conditions can not be readily utilized. MMSE weights can be used to suppress multi-user interference effectively, but the MMSE inversion may be needed, which may lead to high computational complexity.

In conditions where there are relatively uniform SINR conditions, wireless communication devices can use interleaver/scrambling based NOMA schemes with iterative signal detection and soft symbol re-generation and cancellation. In such schemes, a detection matched-filter (MF) is applied to collect the desired user signal. The complexity of such schemes is very low since MMSE inversion is not needed. Additionally, such schemes works well over an AWGN channel. However, using these techniques involves detecting and decoding user signals in serial, and several iterative detections may be needed, which may lead to high signal processing latency.

Some NOMA schemes can achieve additional coding gains by using low code rate channel coding. In some NOMA schemes, a fixed code rate is applied, in which the same parity check bits are used in the channel coding. This tends to negate the coding gain normally achieved by using low code rate channel coding.

In some NOMA schemes, the same bit-to-symbol is applied in modulation. When higher order modulation is applied, the performance is not optimal due to the constraints of low priority bits in the high order modulation. Thus modulation diversity is lost due to using the same bit-to-symbol mapping in the repetition or spreading.

DRAWINGS

While the appended claims set forth the features of the present techniques with particularity, these techniques, together with their objects and advantages, may be best understood from the following detailed description taken in conjunction with the accompanying drawings of which:

FIG. 5A depicts an example of a scrambling and spreading based NOMA scheme, according to an embodiment.

Figure 1:
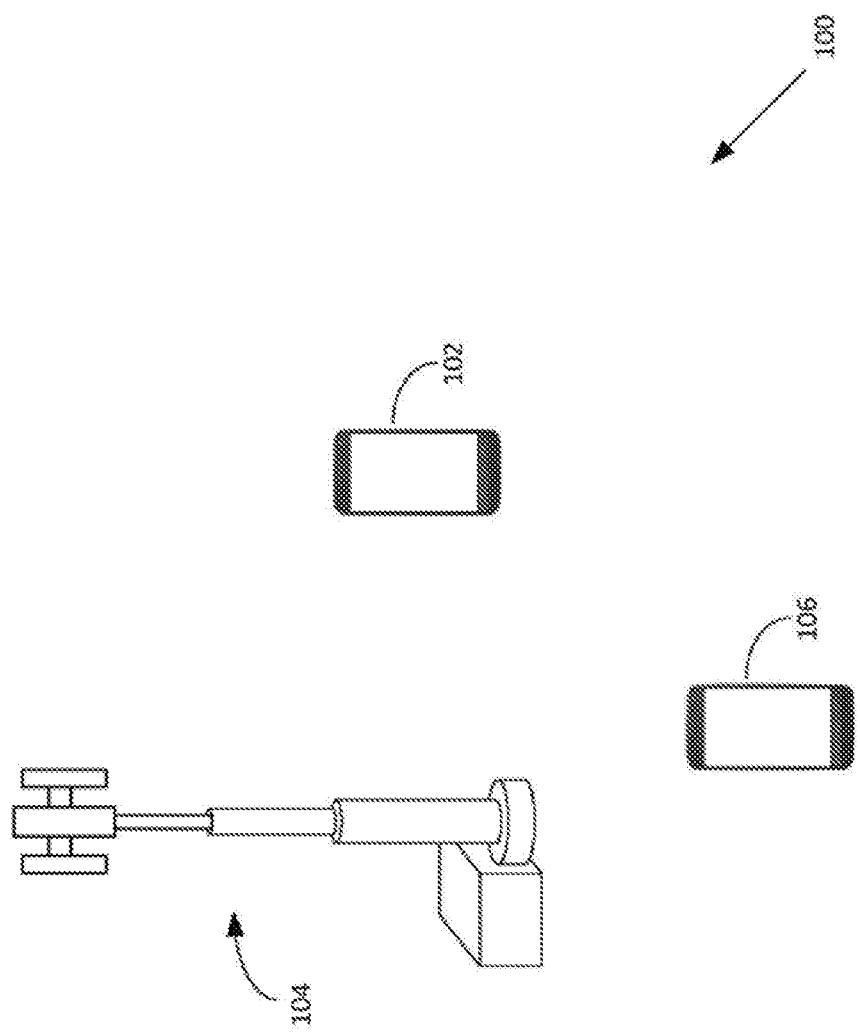
FIG. 1 is a diagram of a system in which various embodiments of the disclosure are implemented.

FIG. 7, FIG. 9, FIG. 11, FIG. 13, FIG. 15, and FIG. 17 depict data stream generation for a single user or single data stream, according to various embodiments.

FIG. 8, FIG. 10, FIG. 12, FIG. 14, FIG. 16, and FIG. 18 depict a transmission signal for a user with multiple data streams, according to various embodiments.

DESCRIPTION

Each of the aforementioned categories of NOMA schemes—spreading-based NOMA schemes and interleaver/scrambling based NOMA scheme—have their advantages and disadvantages. Low code rate based NOMA schemes can achieve additional coding gain, but may have a problem supporting a large number of users. Some NOMA schemes use different bit-to-symbol mappings, which can achieve additional modulation diversity gain, but its detection complexity is very high for a large number of users. Described herein are various methods for facilitating multiple access in a wireless network, in which the positive characteristics of several types of schemes are combined. The various methods described herein (as well as the computer hardware that implements such methods) will have more flexibility to support different SINR conditions and be able to balance the complexity, signal processing latency and performance according to different system requirements. According to an embodiment, the various schemes proposed herein can be detected by an MMSE-SIC or an elementary signal estimator (ESE) detector or combinations thereof, which results in more flexibility for implementing the receiver. Accordingly, performance, signal processing latency, and computational complexity can be flexibly traded off.

According to various embodiments, a wireless communication device applies a repetition code to a data stream; randomizes the data stream; multiplies the data stream by a random sequence; and transmits the data stream after the aforementioned signal processing as a wireless signal.

In various embodiments, a wireless communication device applies a repetition code to a data stream; randomizes (e.g., scrambles or interleaves or combinations thereof) the data stream (e.g., randomizes the bits of the data stream); modulates the scrambled or/and interleaved data stream; multiplies the modulated, scrambled or interleaved data stream by a random sequence; and transmits the modulated, scrambled data stream as a wireless signal.

According to various embodiments, a wireless communication device channel codes a data stream, modulates the channel coded data stream (resulting in symbols), multiplies the modulated, channel coded data stream by a random sequence; applies group repetition to the multiplied, modulated, channel coded data stream; randomizes (e.g., interleaves and/or scrambles) the result of the group repetition (e.g., randomizes the symbols); and transmits the randomized data stream as a wireless signal.

According to various embodiments, a wireless communication device applies group randomization (e.g., group interleaving and/or group scrambling) and group repetition. These terms will be described in more detail below.

A method for facilitating multiple access in a wireless network, involves a wireless communication device applying channel coding to a data stream; applying a group repetition to the data stream (e.g., repeating one or more bits or symbols of the data stream); applying a group randomization (e.g., selected from a local pool) to the data stream; multiplying the data stream by a random sequence (e.g., selected from the set $\{0, 1, -1, i, -i\}$, from the set $\{1, -1, i, -i\}$, selected from complex pseudo-random sequences that have low cross-correlation, a set of elements that are repeated throughout the random sequence); and transmitting the data stream.

In an embodiment, applying the channel coding to the data stream results in a channel coded data stream, and the method further involves modulating the channel coded data stream, resulting in a modulated, channel coded data stream, wherein the steps of applying a group repetition to the data stream, applying a group randomization to the data stream, and multiplying the data stream by a random sequence are carried out on symbols of the modulated, channel coded data stream.

According to an embodiment, applying the channel coding to the data stream results in a channel coded data stream, and the steps of applying a group repetition to the data stream and applying a group randomization to the data stream are carried out on bits of the channel coded data stream.

In an embodiment, the step of applying a group repetition to the data stream is carried out prior to the step of applying a group randomization to the data stream, and the step of applying a group randomization to the data stream is carried out prior to the step of multiplying the data stream by a random sequence.

According to an embodiment, the step of applying a group repetition to the data stream is carried out prior to the step of multiplying the data stream by a random sequence, and the step of multiplying the data stream by a random sequence is carried out prior to the step of applying a group randomization to the data stream.

In an embodiment, the step of multiplying the data stream by a random sequence is carried out prior to the step of applying a group randomization to the data stream, and the step of applying a group repetition to the data stream is carried out prior to the step of applying a group randomization to the data stream.

According to an embodiment, the step of applying a group repetition to the data stream is carried out prior to the step of applying a group randomization to the data stream, and the step of applying a group repetition to the data stream is carried out prior to the step of multiplying the data stream by a random sequence.

In an embodiment, the step of applying a group randomization to the data stream is carried out prior to the step of multiplying the data stream by a random sequence, and the step of applying a group repetition to the data stream is carried out prior to the step of multiplying the data stream by a random sequence.

Examples of applying a group randomization to the data stream include: applying a group interleaver (e.g., data stream-specific, user-specific, and/or cell-specific) to the data stream, carrying out group scrambling (e.g., one or more of data stream-specific, user-specific, and/or cell-specific) on the data stream, and a combination of applying a group interleaver and group scrambling (in either order).

According to an embodiment, applying the group randomization to the data stream includes grouping bits or symbols of the data stream into a plurality of groups of a given length, and applying a randomizer to the plurality of groups, wherein the randomizer has a length that is inversely proportional to the given length (e.g., 1 or an integer number larger than 1).

In an embodiment, applying the group repetition to the data stream includes grouping bits or symbols of the data stream into a plurality of groups of a given length, and applying a repetition code to the plurality of groups.

According to an embodiment, the random sequence is a repeated set of elements multiplied by 1 or −1 within the random sequence.

In an embodiment, the data stream is channel coded using a low code rate coder.

According to an embodiment, the data stream is one of a plurality of replica data streams and the method further includes generating each of the plurality of data streams using the same information bits and different parity check bits. Each of the plurality of channel coded data streams may be modulated using different bit-to-symbol mappings or the same bit-to-symbol mapping.

In an embodiment, the data stream is one of a plurality of replica data streams and the method further includes channel coding each of the plurality of data streams using a low code rate channel coder, the same information bits, and the same parity check bits. Each of the plurality of channel coded data streams may be modulated using different bit-to-symbol mappings or the same bit-to-symbol mapping.

According to an embodiment, transmitting the data stream includes configuring a full power transmission.

In an embodiment, the method further involves determining a transmit power according to a radio resource control signaling, wherein transmitting the data stream includes transmitting the data stream according to the determined transmit power.

In various embodiments, control signaling may indicate the repetition code, randomization, and/or the random sequence.

According to an embodiment, the data stream is one of a plurality of data streams and the method further involves dividing a single data stream into the plurality data streams, wherein each of the plurality of data streams is different from the others.

In an embodiment, the data stream is one of a plurality of data streams and the method further involves repeating the steps of applying a group randomization and multiplying the data stream by a random sequence for each of the plurality of data streams, resulting in a plurality of randomized data streams, in which the transmitting step involves transmitting the plurality of randomized data streams in a wireless signal. The method may further involve, for each of the plurality of data streams: rotating the data stream in the power domain according to a rotation coefficient, scaling the data stream in the power domain according to a power allocation, and adding the plurality of the rotated and scaled data streams together. The rotation coefficient and the power allocation for each of the plurality of data streams may the same or different, and may be predefined or determined by control signaling.

In various embodiments where there are a plurality of data streams, the method may further involve mapping the plurality of data streams onto a common resource or set of resources, and carrying out power allocation on the common resource or set of resources.

A wireless communication device configured to carry out any of the methods described herein is also provided. Additionally, provided herein is a non-transitory computer readable medium having stored thereon computer-executable instructions for carrying out one or more methods described herein.

In a conventional interleaver/scrambling based NOMA scheme, the length of the group can be regarded as 1. In this case, the user signal is well randomly distributed or randomly scrambled. Repetition is used as a special spreading. Because group randomization is not applied in conventional interleaver/scrambling based NOMA schemes, MMSE calculation cannot be applied. Instead, an MF is applied to minimize computational complexity.

According to an embodiment, using group randomization, the length of the group is a flexible value. When Binary Phase Shift Keying (BPSK) modulation is applied, the group can be 1. After repetition and randomization, BPSK modulation is applied. Then, the modulated symbols are multiplied by a sequence (e.g., multiplied by a random sequence of values selected from $\{0,1,-1, i,-i\}$ or $\{1,-1, i,-i\}$).

According to an embodiment, multiplying the modulated symbol with a random sequence can further randomize multi-user interference. The random sequence can be absorbed by the equivalent channel matrix, and an MMSE operation can be applied for multi-user interference suppression. Because the user signal is randomly distributed by using a randomization scheme with a group length of 1 (e.g., an interleaver or scrambler or combinations thereof with a group length of 1), the user signal may only be detected individually. Thus, the dimension of the channel matrix is small (e.g., when 1 transmit antenna and 2 receive antennas are assumed, the channel dimension is 1 by 2; when channel matrices of multiple users are collected together, the dimension of the channel matrix inversion is only 2 by 2). Therefore, the computational complexity of this scheme is also very low. MMSE has a greater ability to suppress multi-user interference than MF. Thus, when iterative detection is applied, the aforementioned scheme can achieve better performance.

In an embodiment, both the transmitting device and receiving device know the repetition code, randomization sequence (e.g., the and multiplication sequence are known by the transmitter and receiver). The length of the group randomization, the index of the repetition code, the index of multiplication sequence, the index of the interleaver or/and scrambling can be informed by control signaling. For example either the transmitting or receiving device can, by way of control signaling (e.g., RRC signaling), indicate the group length of the randomization, the index of the repetition code, the index of multiplication sequence, the index of the interleaver or/and scrambling to the other device.

In an embodiment, the multiplication sequence can be selected from a locally generated pool. For example, a device could generate 64 multiplication sequences (random or otherwise) and then randomly select one multiplication sequence from the 64 sequences in the pool.

When multiple data streams are applied, each data stream is rotated and power scaled. The rotation coefficient and the power allocation can be determined by the control signaling or may be predefined.

FIG. 1 depicts a multi-user wireless communication system 100 in which the various embodiments described herein may be implemented. The communication system 100 includes several wireless communication devices ("wireless communication device" will sometimes be shortened herein to "communication device" or "device" for convenient reference). The communication devices depicted are a first communication device 102 (depicted as a user equipment ("UE")), a second communication device 104 (depicted as a base station), and a third communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other base stations, other UEs, wireless infrastructure, wired infrastructure, and other devices commonly found in wireless networks. Possible implementations of the communication devices include any device capable of wireless communication, such as a smartphone, tablet, laptop computer, and non-traditional devices (e.g., household appliances or other parts of the "Internet of Things"). When operating as part of a wireless communication system, a wireless communication device may be referred to as a "wireless network node." A wireless communication device communicates primarily by transmitting and receiving wireless signals.

Figure 2:
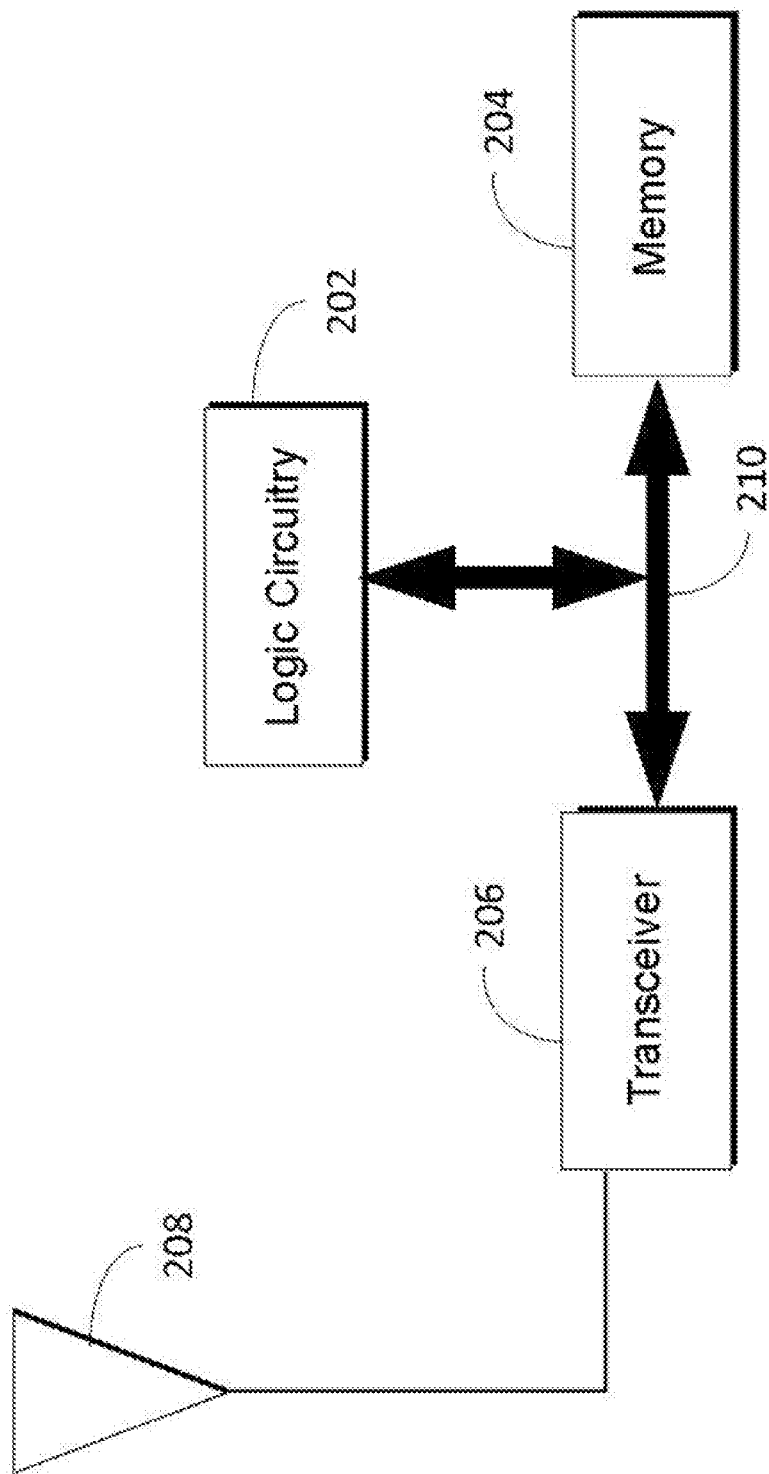
FIG. 2 shows an example hardware architecture of a communication device, according to an embodiment.

FIG. 2 illustrates a basic hardware architecture implemented by each of the wireless communication devices of FIG. 1, according to an embodiment. The elements of FIG. 1 may have other components as well. The hardware architecture depicted in FIG. 2 includes logic circuitry 202, memory 204, transceiver 206, and one or more antennas represented by antenna 208 (including transmit antennas and/or receive antennas). The memory 204 may be or include a buffer that, for example, holds incoming transmissions until the logic circuitry is able to process the transmission. Each of these elements is communicatively linked to one another via one or more data pathways 210. Examples of data pathways include wires, conductive pathways on a microchip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

The term "group randomization" as used herein refers to randomization of a series of bits (e.g., bits of a data stream) or a series of symbols (e.g., symbols of a modulated data stream). Examples of randomization include applying an interleaver, carrying out scrambling, and a combination of applying an interleaver and carrying out scrambling.

Figure 3A:
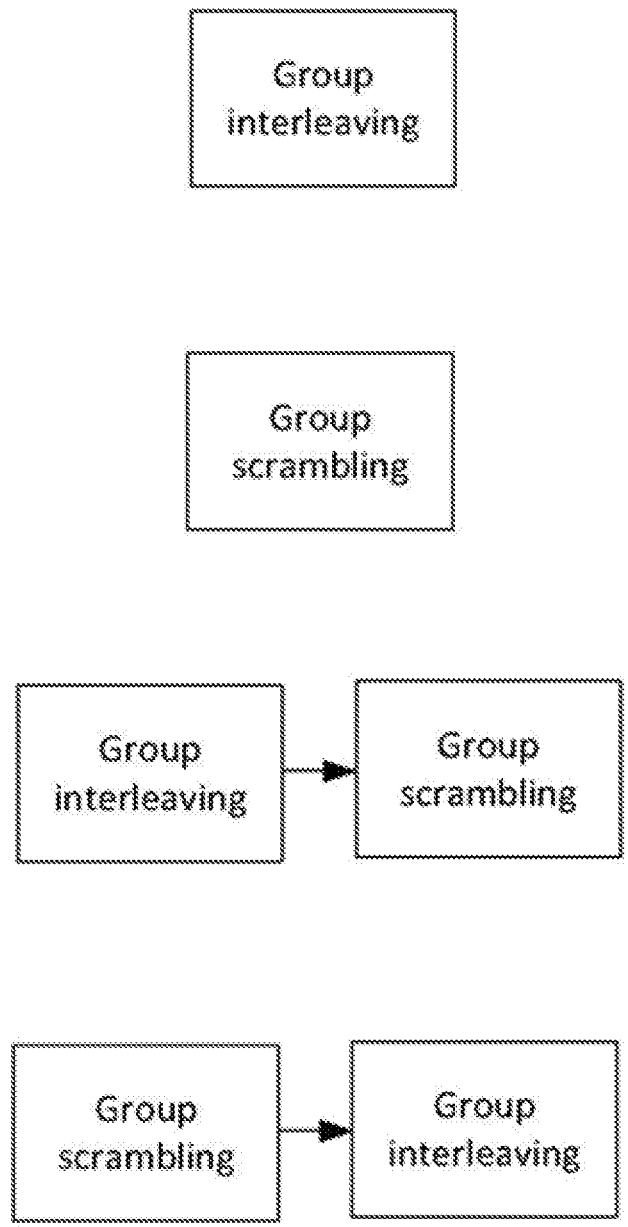
FIG. 3A depicts possible implementations of group randomization, according to an embodiment.

The term "group randomization" as used herein refers to randomization of a series of bits (e.g., bits of a data stream) or a series of symbols (e.g., symbols of a modulated data stream) in which the bits or symbols are grouped. Examples of group randomization include applying a group interleaver, applying group scrambling, or a combination of applying a group interleaver and applying group scrambling. When the combination of a group interleaver and group scrambling is applied, the group length of the interleaver and the group length used for the scrambling can be the same or different. Thus, when the figures depict a block labeled "group randomization," possible substitution blocks include those depicted in FIG. 3A.

As used herein, "group interleaving" refers to a technique in which an interleaver is used to change the positions of several continuous bits (which can be regarded as one group) or several continuous symbols. It is different from conventional interleaving because conventional interleaving involves the following steps: 1) An interleaver is generated whose length is equal to the length of the bit sequence or symbol sequence to be interleaved. 2) The input bits or symbols are interleaved by the interleaver. In contrast, group interleaving, in an embodiment, involves the following steps: 1) The input bits or symbols are grouped, and in each group several continuous bits or symbols are included. 2) The length of the interleaver is the length of the sequence of bits or symbols to be interleaved divided by the length of the group bits or symbols (i.e., the length of the interleaver is inversely proportional to the group length). Put another way, the length of the interleaver is the number of bits or symbols in a sequence divided by the number of bits or symbols per group. 3) The grouped input bits or symbols are interleaved by the group interleaver.

To illustrate, assume that there is a set of input bits 01001001. A conventional interleaver may be [8, 1, 2, 5, 7, 6, 4, 3]. When a communication device uses this interleaver on the input bits, the bits output (the interleaved bits) are 10110000.

Figure 3B:
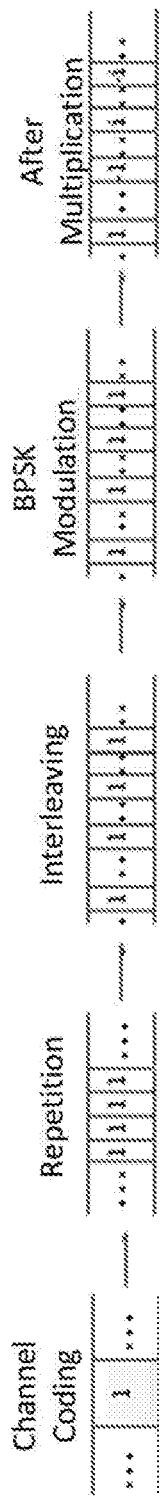
FIG. 3B depicts an interleaver and spreading based NOMA scheme, according to an embodiment.
Figure 3C:
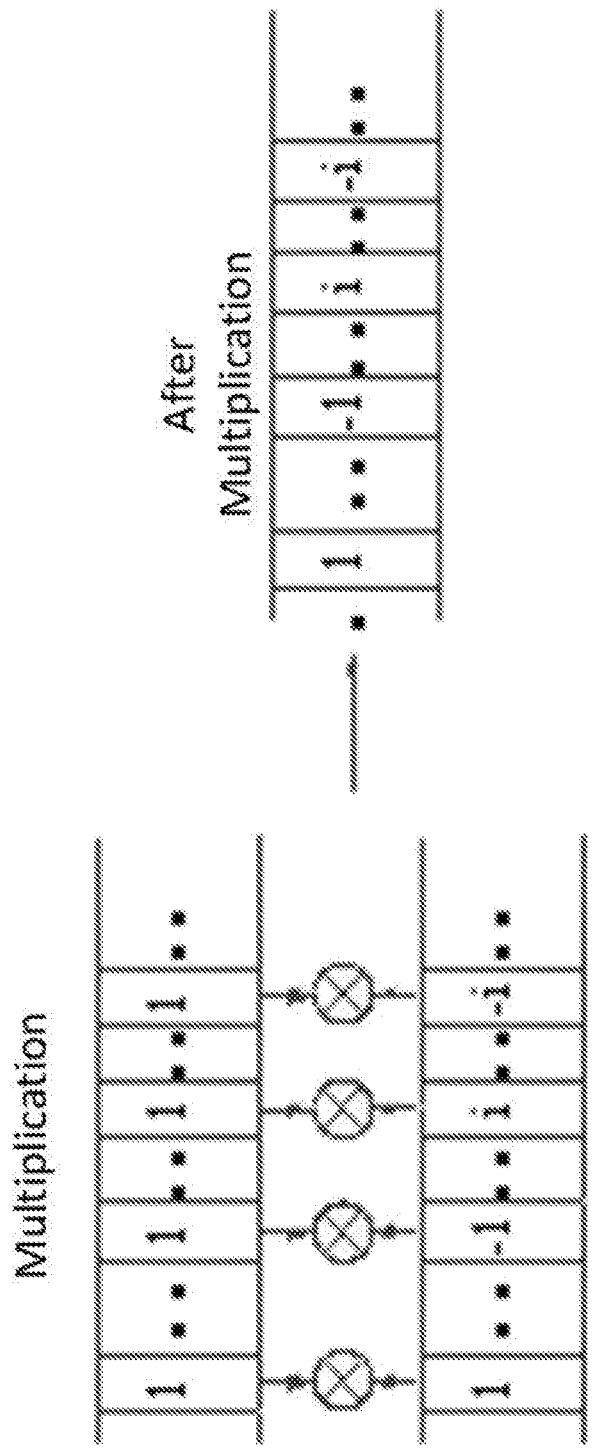
FIG. 3C depicts multiplication of the BPSK modulation from FIG. 3B with a sequence, according to an embodiment.

Now assume that a group interleaver configured according to an embodiment is used. Further assume that the group length is 2, the input bits are grouped as 01 00 10 01, and the group interleaver is [4, 2, 1, 3]. The group interleaver has a length of 4. When the communication device uses the group interleaver on the input bits, the output bits (the interleaved bits) are 01 00 01 10. FIG. 3B and FIG. 3C depict an interleaver and spreading based NOMA scheme that uses BPSK, according to an embodiment. FIG. 4B and FIG. 4C depict an interleaver and spreading based NOMA scheme that uses QPSK (e.g., using the constellation of FIG. 4A), according to an embodiment.

According to an embodiment, the interleaver is the series [1, 2, 3, . . . , K], where K is the length of the bits or symbols to be input into the interleaver divided by the length of the group bits or symbols. In such case there is no signal processing function for that particular module (e.g., for the group randomization block shown in the various figures).

As used herein, group scrambling refers to a technique in which several continuous bits or symbols (which can be regarded as one group) are masked by the same scrambling bit or symbol. It is different from conventional scrambling because normal scrambling involves the following steps: A communication device: 1) Generates a scrambling code whose length is equal to the length of the bits or symbols to be scrambled. 2) The input sequences are masked by the scrambling code. In contrast, group scrambling (according to an embodiment) involves the following steps: 1) The communication device groups the input bits or symbols, and in each group several continuous bits or symbols are included. 2) The communication device sets the length of the scrambling code (also referred to as "group scrambling code") to be the length of the bits or symbols to be scrambled divided by the length of the grouped bits or symbols. Put another way, the length of the scrambling code is the number of bits or symbols in an input sequence divided by the number of bits or symbols per group. 3) The communication device masks the grouped input bits or symbols by using the scrambling code.

To illustrate, assume that there is a set of input bits 01001001. Further assume that conventional scrambling is used with a scrambling code of 01011010. Thus, after scrambling, the bits are 00010011.

Figure 5A:
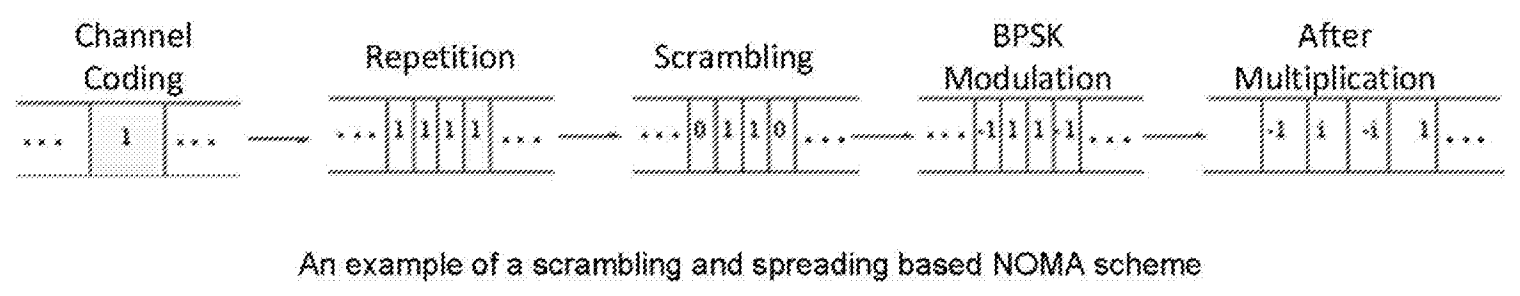
Figure 5B:
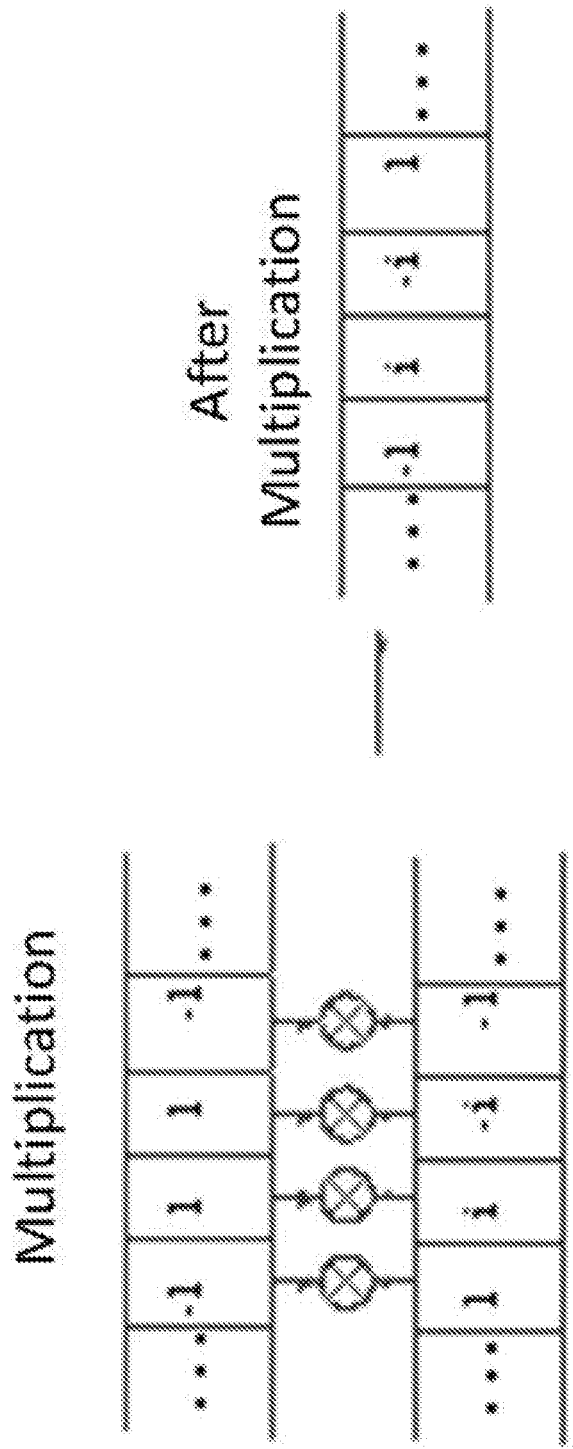
FIG. 5B depicts multiplication of the BPSK modulation of FIG. 5A with a sequence, according to an embodiment.

Now assume that group scrambling according to an embodiment is used. When the group length is 2, the input bits are grouped as 01 00 10 01, and the group scrambling code is 0110. After group scrambling is applied, the bits are 01110101. FIG. 5A and FIG. 5B depict an example of a scrambling and spreading based NOMA scheme, according to an embodiment.

Figure 4A:
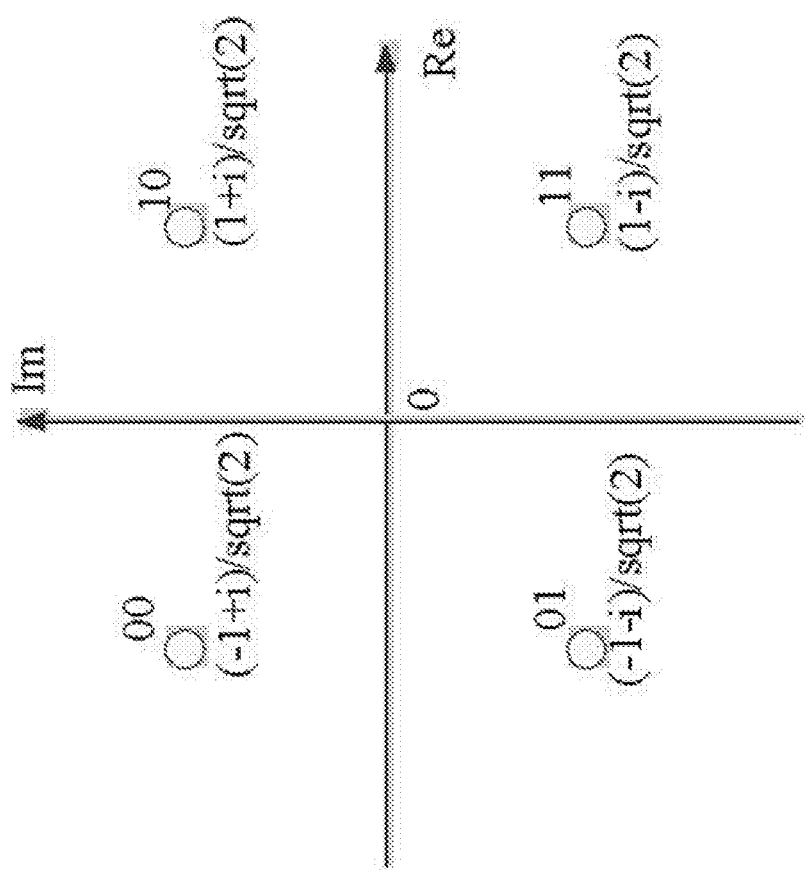
FIG. 4A depicts an example of constellation to be used for QPSK modulation.
Figure 4B:
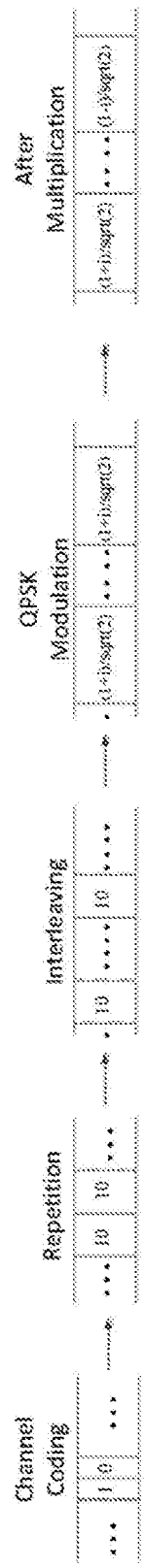
FIG. 4B depicts an example of an interleaving and spreading based NOMA scheme, according to an embodiment, which uses QPSK modulation.
Figure 4C:
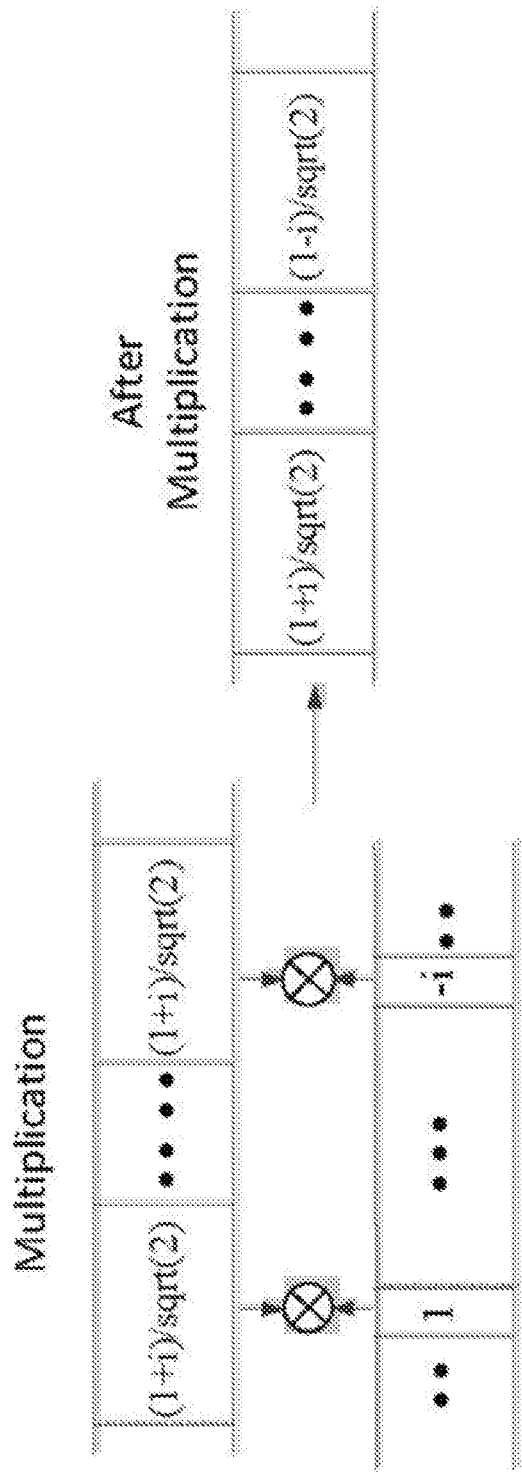
FIG. 4C depicts an example of a QPSK-modulated data stream being multiplied by a sequence, according to an embodiment.

According to an embodiment, the scrambling code is the series [0, 0, 0, . . . , 0], or [a, a,a, . . . , a] Ca' is the symbol mapped by the grouped bits of zeros, so that, for example, using the mapping shown in FIG. 4A, 'a' would be equal to (−1+i)/sqrt(2)), which has the length of the bits or symbols to be input into the scrambler divided by the length of the group bits or symbols. In such case there is no signal processing function for that particular module (e.g., for the group randomization block shown in the various figures).

As used herein, group repetition refers to a technique in which several continuous bits or symbols (which can be regarded as one group) are multiplied with a repeated sequence. When continuous symbols are multiplied with a repeated sequence, the repeated sequence has a value of 1 or −1. When continuous bits are multiplied with a repeated sequence, the repeated sequence has a value of 1. It is different from conventional repetition because normal repetition involves the following steps: A communication device: 1) Generates a repeated sequence whose value is 1.2) The input sequences is multiplied with the element of the repeated sequence. In contrast, group repeating (according to an embodiment) involves the following steps: 1) The communication device groups the input bits or symbols, and in each group several continuous bits or symbols are included. 2) The communication device defines the length of the repetition sequence by the length of the bits or symbols to be repeated divided by the length of the grouped bits or symbols. 3) The element of the grouped repetition sequence is 1 or −1 for input symbols. The element of the grouped repetition sequence is 1 for the input bits. 4) The communication device multiplies the grouped input bits or symbols by using the group repetition sequence.

An example of bit-level group repetition according to an embodiment is as follows: Assume that, as a result of channel coding, a wireless communication device obtains 011000. If the repetition factor is 4, applying repetition would result in 000011111111000000000000. If, on the other hand, the communication device uses group repetition, assuming that 2 bits are used for the group size, the device, as a result of applying group repetition, would obtain 010101011010101000000000. When QPSK is used for modulation, two symbols (00 and 11) are obtained for the former, while three symbols (01, 10, 00) are obtained for the latter.

Figure 6A:
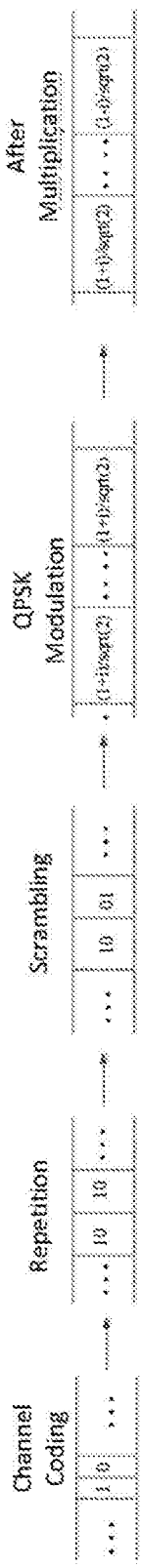
FIG. 6A depicts an example of a scrambling and spreading based NOMA scheme, according to an embodiment, which uses QPSK modulation.
Figure 6B:
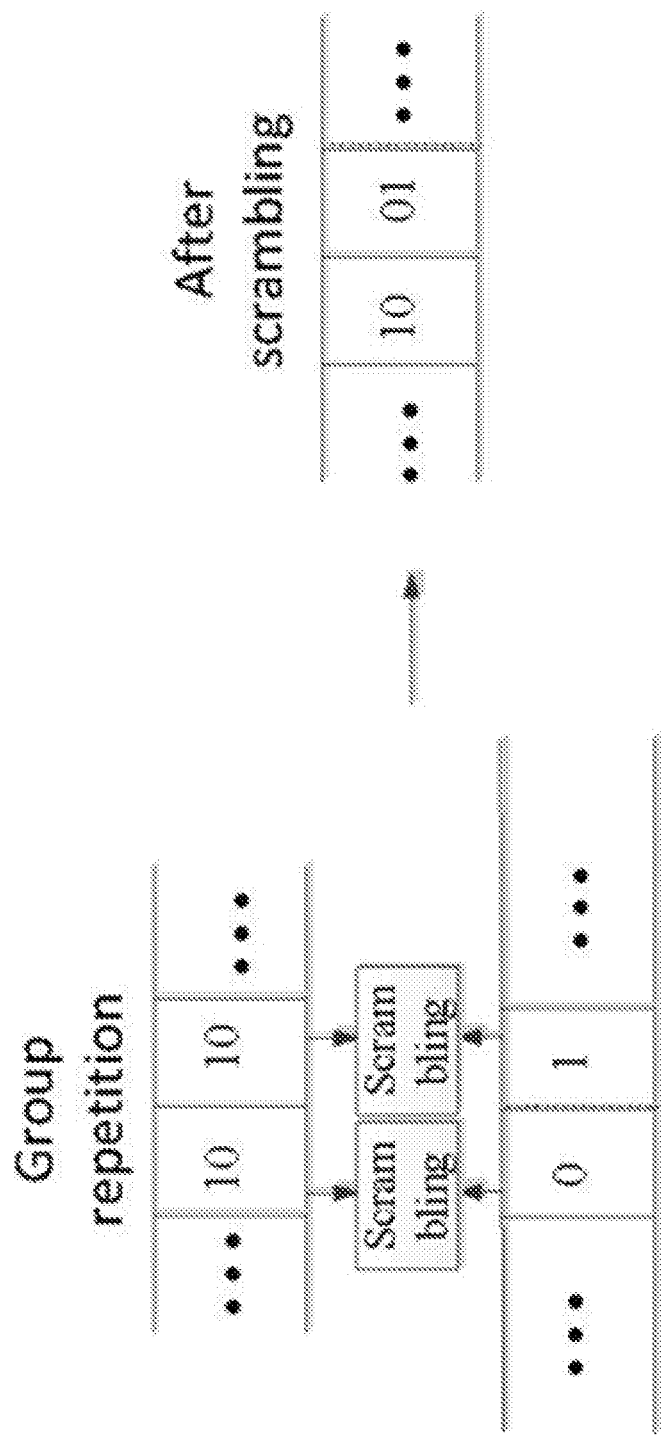
FIG. 6B depicts an example of group scrambling.

FIG. 6B shows an example of group scrambling with group repetition, according to an embodiment. An example of symbol-level group repetition according to an embodiment is as follows: Assume that, as a result of modulation, a wireless communication device obtains [(1+i), (1−i), (−1+i), (−1−i)]/sqrt(2). For symbol-level repetition, a group length of 1 is used with a group sequence of [1, −1, 1, −1, 1, 1, 1, 1, 1, 1, 1, 1, 1, 1, 1, −1]. If the repetition factor is 4, applying repetition would result in [(1+i), (−1−i), (1+i), (−1−i), (1−i), (1−i), (1−i), (1−i), (−1+i), (−1+i), (−1+i), (−1+i), (−1−i), (−1−i), (−1−i), (1+i)]/sqrt(2). When the group length is 2 and the group sequence is [1, 1, −1, 1, −1, −1, 1, −1] the result is [(1+i), (1−i), (1+i), (1−i), (−1−i), (−1+i), (1+i), (1−i), (1−i), (1+i), (1−i), (1+i), (−1+i), (−1−i), (1−i), (1+i)]/sqrt(2).

Because MMSE weight has better multi-user interference suppression effect than MF, the generalized multiplied sequence can be used at the receiver with a large group length. For example, the multiplied sequence can be a repetition of a short multiplied sequence. In the repetition, the short sequence is multiplied with 1 or −1. As an example, assume that the short multiplied sequence is [1, −1, i, −i]. After 4 repetitions the sequence is [1, −1, 1, −1, −1, 1, 1, −1, i, −i]. Or assume that the short multiplied sequence is [1, i]. After 8 repetitions the sequence is [1, i, 1, i, −1, −i, 1, i, 1, i,−1, −i,−1, −i, 1, i]. A longer length for the short multiplied sequence leads to better multi-user suppression, while the dimensionality of the MMSE inversion also increases, which leads to much higher computational complexity. Thus, there is a trade off between the effectiveness of the short multiplied sequence and the computational complexity.

Figure 6C:
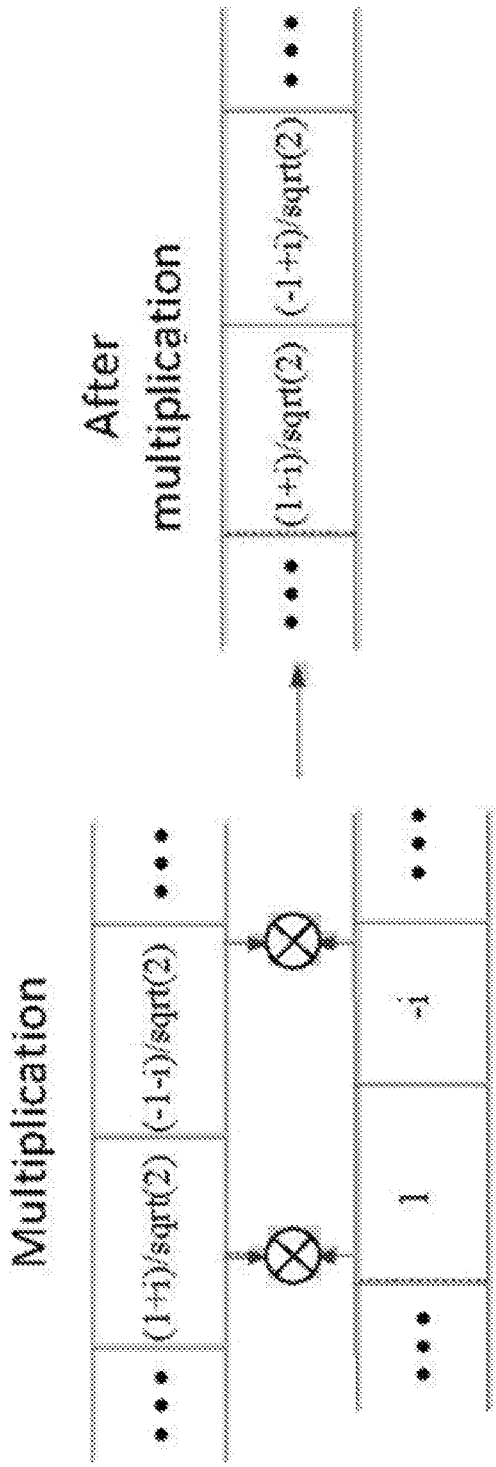
FIG. 6C depicts multiplication of the QPSK modulation of FIG. 6A with a sequence, according to an embodiment.

To illustrate the result of communication device multiplying by a sequence, FIG. 3C shows multiplication of the BPSK modulation of FIG. 3B with a sequence, while FIG. 5B shows multiplication of the BPSK modulation of FIG. 5A with a sequence, according to an embodiment. FIG. 6C shows multiplication of the QPSK modulation of FIG. 6B with a sequence, according to an embodiment.

In an embodiment, an MA/ISE-SIC receiver is employed. In this case, the multiplied sequence is a repetition of a short sequence. When the group length of the repetition sequence is 4, some example short multiplied sequences are as follows:

| 1.0000 | 1.0000 | 1.0000 | 1.0000 |
|--------|--------|--------|--------|
| 1.0000 | 1.0000 | −1.0000 | −1.0000 |
| 1.0000 | −1.0000 | 1.0000 | −1.0000 |
| 1.0000 | −1.0000 | −1.0000 | 1.0000 |
| 1.0000 | 1.0000 | 0 + 1.0000i | 0 − 1.0000i |
| 1.0000 | 1.0000 | 0 − 1.0000i | 0 + 1.0000i |
| 1.0000 | −1.0000 | 0 + 1.0000i | 0 + 1.0000i |
| 1.0000 | −1.0000 | 0 − 1.0000i | 0 − 1.0000i |

When the length of the symbols after BPSK modulation is 400, then the short multiplied sequence is repeated 100 times to obtain a multiplied sequence with length 400.

According to an embodiment, when a communication device uses quadrature phase-shift keying (QPSK) modulation, a group randomization scheme may be applied. An example of this procedure is as follows. A communication device carries out channel coding on a user data stream. As a result of the channel coding, 4 bits are obtained: 0100 in this example. These bits are repeated 4 times and the result is 16 bits 0000111100000000 for the length of group repetition 1. When the group length is 1, the interleaver sequence may be, for example, [16, 9, 15, 7, 2, 3, 8, 12, 6, 5, 10, 4, 11, 13, 14]. In this scenario, when one transmitting antenna and two receiver antennas are assumed, the dimension of the MMSE inversion is 2 by 2 for multiple users. The multi-user interference suppression effect is not optimal, since the dimension of the MMSE inversion is small. To achieve better multi-user interference suppression, a long group randomization (e.g., interleaving/scrambling) sequence can be applied (e.g., the communication device uses an interleaver or scrambler to do this). When the group length of repetition is 2, after 4 repetitions, the device obtains 0101010100000000. When the group length of randomization is 4, the interleaver sequence may be, for example, [1, 2, 3, 4, 13, 14, 15, 16, 9, 10, 11, 12, 5, 6, 7, 8]. After the interleaver is applied by the communication device, the result is 0101000000000101. After the communication device applies QPSK modulation, the result is 8 symbols. Two symbols are in the neighbor positions and they are the same. These two symbols are multiplied with a sequence. Some examples of sequences having a length of 2 are as follows:

1 1
1 i
1 −1
1 −i

In this scenario, when one transmitting antenna and two receiver antennas are assumed, the dimension of the MMSE inversion is 4 by 4 for multiple users.

As noted previously, an interleaver implemented according to an embodiment can carry out interleaving on bits or on symbols. For a bit-level interleaver, as an example, assume the input bits are 0100110010010011. When the interleaver group length is 1 bit, the bits being input into the interleaver are 0 1 0 0 1 1 0 0 1 0 0 1 0 0 1 1. Assume that the corresponding interleaver for a group length of 1 is [1, 13, 2, 16, 9, 3, 7, 15, 11, 8, 10, 4, 12, 6, 14, 5]. Then, after the interleaver is applied by the communication device, the result is 0110010000011101. When the interleaver group length is 2, the bits being input into the interleaver are 01 00 11 00 10 01 00 11. Assume that the corresponding interleaver for a group length of 2 is [1, 8, 3, 7, 2, 6, 5, 4]. Then, after the interleaver is applied by the communication device, the result is 0111110000011000. When the interleaver group length is 4, the bits being input into the interleaver are 0100 1100 1001 0011. Assume that the corresponding interleaver for group length 4 is [1, 3, 2, 4], then after interleaver is applied the result is 0100100111000011. When the interleaver group is 8, the bits being input into the interleaver are 01001100 10010011. Assume that the corresponding interleaver for group length 8 is [2, 1]. Then, after the communication device applies the interleaver, the result is 1001001101001100.

For a symbol-level interleaver implemented according to an embodiment, as an example, assume the input symbols are [(1+i), (−1+i), (1−i), (−1−i), (−1+i), (1−i), (1+i), (−1−i)]/sqrt(2). When the group length of the interleaver is 1, the corresponding interleaver sequence for group length 1 is [1, 8, 3, 7, 2, 6, 5, 4]. The symbols being input into the interleaver are [(1+i), (−1+i), (1−i), (−1−i), (−1+i), (1−i), (1+i), (−1−i)]/sqrt(2). After interleaver is applied, the result is [(1+i), (−1−i), (1−i), (1+i), (−1+i), (1−i), (−1+i), (−1−i)]/sqrt(2). When the interleaver group length is 2, the corresponding interleaver is [1, 3, 2, 4]. The symbols being input into the interleaver are [(1+i), (−1+i), (1−i), (−1−i), (−1+i), (1−i), (1+i), (−14)]/sqrt(2). After the interleaver is applied, the result obtained by the communication device is [(1+i), (−1+i), (−1+i), (1−i), (1−i), (−1−i), (1+i), (−1−i)]/sqrt(2).

Scrambling according to an embodiment can performed on bits or symbols. For bit-level scrambling, as an example, assume the input bits are 0100110010010011. When the scrambling group length is 1, the bits before scrambling are 0 1 0 0 1 1 0 0 1 0 0 1 0 0 1 1. The corresponding scrambling for group length 1 is 1101001001000100, then after scrambling is applied the result is 1001111011010111. When the scrambling group length is 2, the bits before scrambling are 01 00 11 00 10 01 00 11. The corresponding scrambling for group length 2 is 01001110, then after scrambling is applied the result is 0111110001101111 (1 scrambling bit masks 2 input bits since the group length is 2). When the scrambling group is 4, the bits before scrambling are 0100 1100 1001 0011. The corresponding scrambling for group length 4 is 0101, then after scrambling is applied the result is 0100001110011100.

For symbol-level scrambling according to an embodiment, as an example, assume the input symbols are [(1+i), (−1+i), (1−i), (−1−i), (−1+i), (1−i), (1+i), (−14)]/sqrt(2). According to the bit-to-symbol mapping of FIG. 4A, the bits corresponding to these symbols are 10001101001110001. FIG. 4A is an example of bit-to-symbol mapping. There are other bit-to-symbol mapping methods as well. When the scrambling group length is 1, the bits before scrambling are 1 0 0 0 1 1 0 1 0 0 1 1 1 0 0 1. Assume that the corresponding scrambling code for group length 1 is 1101001001000100. Then, after scrambling is applied, the result obtained by the communication device is 0101111101111101. According to FIG. 4A, the corresponding symbols after symbol level scrambling are [(−1−i), (−1−i), (1−i), (1−i), (−1−i), (1−i), (1−i), (−14)]/sqrt(2). When the scrambling group length is 2, the bits before scrambling are 10 00 11 01 00 11 10 01. Assume that the corresponding scrambling code for a group length of 2 is 01001110. Then, after scrambling is applied, the result is 1011110111000101. According to FIG. 4A, the corresponding symbols after symbol level scrambling are [(1+i), (1−i), (1−i), (−1−i), (1−i), (−1+i), (−1−i), (−14)]/sqrt(2). When the scrambling group length is 4, the bits before scrambling are 1000 1101 0011 1001. Assume that the corresponding scrambling for group length 4 is 0110. Then, after scrambling is applied, the result is 1000001011001001. According to FIG. 4A, the corresponding symbols after symbol level scrambling are [(1+i), (−1+i), (−1+i), (1+i), (1−i), (−1+i), (1+i), (−14)]/sqrt(2). Symbol-level scrambling for other modulations can use the same principles just described.

In an embodiment, a short sequence can be multiplied. For example, a short multiplied sequence with a length of 2 could be repeated 4 times. In each repetition, it might be multiplied by 1 or −1. For example, when the repetition involves a short sequence of [1, i] repeated 4 times, example sequences are:

1 i 1 i 1 i 1 i
1 i −1 −i −1 −i 1 i
−1 −i 1 i 1 i −1 −i

As a result, there will be a multiplied sequence with a length of 8. This sequence is multiplied with the modulated symbols whose length is 8. When a sequence is obtained by the repetition of a short sequence, the communication device can obtain the MMSE weight on the positions of the repetition from the MMSE weight of the first short sequence by multiplying by 1 or −1.

In an embodiment, the communication device can also use a randomly generated multiplied sequence with a length of 8 for multiplication of the modulated symbols. In this scenario, many MMSE weights should be calculated since, unlike in the repetition scheme, the short sequences are not necessarily the same.

As previously noted, various embodiments described herein combine interleaving and spreading. The communication device can apply an MMSE weight to suppress the multi-user interference, and can apply iterative detection for signal detection. In a high interference environment, the group length of the interleaver can be, for example, 8. An example of the interleaver is [9, 10, 11, 12, 13, 14, 15, 16, 1, 2, 3, 4, 5, 6, 7, 8]. Some examples of short multiplication sequences with a length of 4 are as follows:

| | | | |
|---|---|---|---|
| 1.0000 | 1.0000 | 1.0000 | 1.0000 |
| 1.0000 | 1.0000 | −1.0000 | −1.0000 |
| 1.0000 | −1.0000 | 1.0000 | −1.0000 |
| 1.0000 | −1.0000 | −1.0000 | 1.0000 |
| 1.0000 | 1.0000 | 0 + 1.0000i | 0 − 1.0000i |
| 1.0000 | 1.0000 | 0 − 1.0000i | 0 + 1.0000i |
| 1.0000 | −1.0000 | 0 + 1.0000i | 0 + 1.0000i |
| 1.0000 | −1.0000 | 0 − 1.0000i | 0 − 1.0000i |

According to an embodiment, the multiplication sequence is a series of 1's (e.g., [1, 1 1, . . . , 1]). In such case there is no signal processing function for that particular module (e.g., for the multiplication block shown in the various figures).

In an embodiment, elements of a random multiplication sequence are selected from complex pseudo-random sequences that have low cross-correlation. One example of such sequences can be found in and in TABLE II and TABLE III in R1-164557 (3GPP R1-164557, Initial LLS Evaluation Result for NoMA, LG Electronics).

Further examples of multiplication sequences are as follows. Case 1: Random multiplication sequence. In this case the multiplication sequence does not have a periodic property. Case 2: Periodic multiplication sequence. A periodic multiplication in sequence has a periodic property and can be generated by using two sequence. For example, sequence1=[s1, s2, s3, s4], sequence2=[1, −1, −1, 1], and the final sequence is sequence1×sequence2=[s1, s2, s3, s4, −s1, −s2, −s3, −s4, −s1, −s2, −s3, −s4, s1, s2, s3, s4]. This can be regarded as a generalized periodic sequence. The multiplication sequence can also be a collection of multiple sequences. For example, sequence1=[s1, s2, s3, s4] and sequence2=[1, −1, −1, 1]. Then the sequences are multiplied to result in [s1, s2, s3, s4, −s1, −s2, −s3, −s4, −s1, −s2, −s3, −s4, s1, s2, s3, s4]. When sequence3=[s5, s6, s7, s8] and sequence2=[−1, 1, 1, 1], the multiplied result is sequence3× sequence4=[−s5, −s6, −s7, −s8, s5, s6, s7, s8, s5, s6, s7, s8, s5, s6, s7, s8]. The collection of these two sequences can be [s1, s2, s3, s4, −s1, −s2, −s3, −s4, −s1, −s2, −s3, −s4, s1, s2, s3, s4, −s5, −s6, −s7, −s8, s5, s6, s7, s8, s5, s6, s7, s8, s5, s6, s7, s8] or [s1, s2, s3, s4, −s5, −s6, −s7, −s8, −s1, −s2, −s3, −s4, s5, s6, s7, s8, −s1, −s2, −s3, −s4, s5, s6, s7, s8, s1, s2, s3, s4, s5, s6, s7, s8], or other forms.

Figure 7:
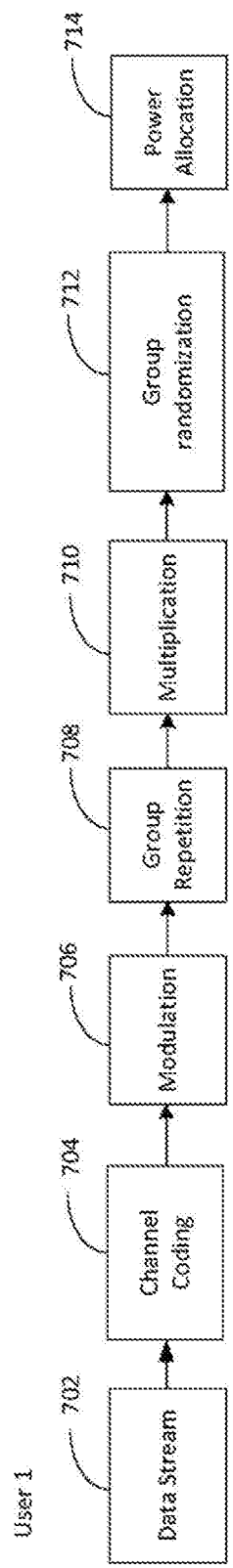

Turning to FIG. 7, an embodiment of a communication scheme in which one data stream per wireless communication device is used will now be described. In this embodiment, the data stream is encoded by channel coding. After modulation, group repetition is applied. The resulting signal is multiplied with multiplication sequence. Then, group randomization is applied. The resulting signal is transmitted according to the allocated power. In particular, the communication device takes the data stream 702, channel codes it at block 704, modulates the data stream at block 706 (e.g., using BPSK or QPSK), carries out group repetition at block 708, multiplies the data stream by a sequence (e.g., a random sequence) at block 710, carries out group randomization at block 712, and carries out power allocation at block 714.

An example of a special configuration for FIG. 7 is as follows: After modulation, the symbols [ . . . , s_i, s_i+1, . . . ] are repeated 4 times, which results in [ . . . , s_i, s_i, s_i, s_i, s_{i+1}, s_{i+1}, s_{i+1}, s_{i+1}, . . . ]. Then, all symbols are multiplied with the same spreading sequence [m_1, m_2, m_3, m_4] and the result is [ . . . , s_im_1, s_im_2, s_im_3, s_im_4, s_{i+1}m_1, s_{i+1}m_2, s_{i+1}m_3, s_{i+1}m_4, . . . ]. Assuming that the interleaver is configured as [1, 2, 3, . . . , N] (N is the number of bits or symbols input to the group interleaver), the scrambling is configured as [000 . . . 0] (length of group scrambling), and the power allocation is configured as full power transmission.

Figure 8:
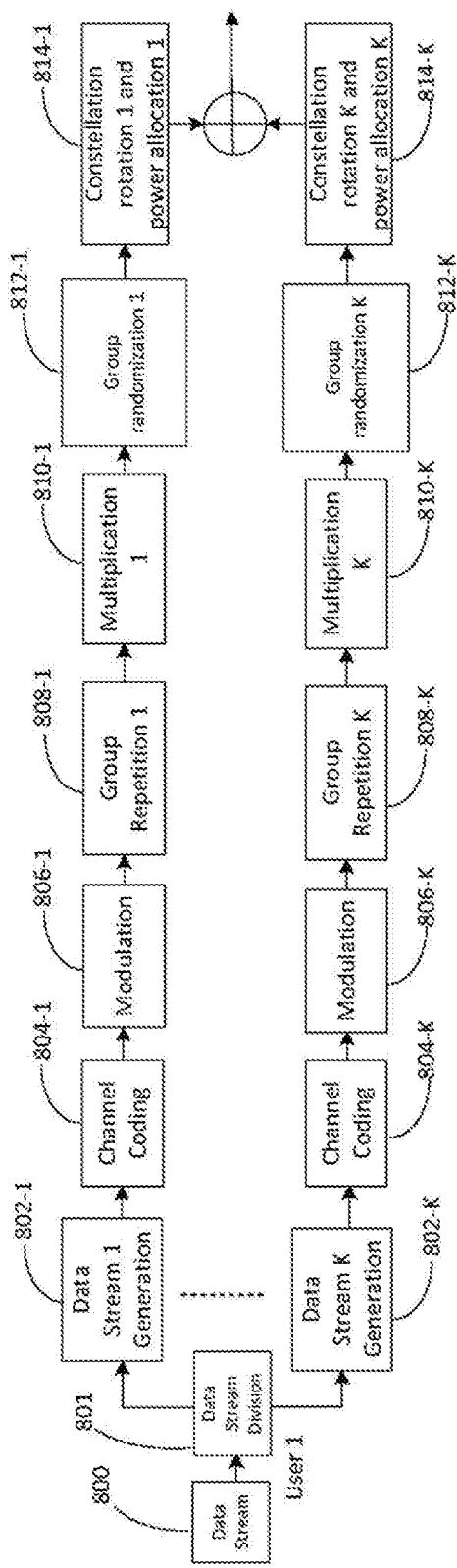

Turning to FIG. 8, an embodiment of a communication scheme in which multiple data streams per wireless communication device are used will now be described. In this embodiment, multiple data streams, which are different from one other, are transmitted. The group repetition sequence, multiplication sequence, randomization, constellation rotation, and power allocation may be the same or different for each data stream. In particular, for each Kth data stream that the communication device needs to transmit at a given time, the communication device carries out the steps depicted in FIG. 7 through group randomization. The device takes the data stream 800 and divides it at block 801 into data streams 802-1 through 802-K. Using the 1st stream as an example, the device takes the data stream 802-1, channel codes it at block 804-1, modulates the data stream at block 806-1, carries out group repetition with repetition code 1 at block 808-1, multiplies the data stream by a sequence 1 (an ordinal designation—the sequence can be any appropriate value chosen by the communication device, such as values selected from {0, 1, −1, i, −i} or {1, −1, i, −i}) at block 810-1, carries out group randomization according to a group randomization scheme 1 at block 812-1, and carries out constellation rotation with a rotation factor 1 (which may be any value—the number 1 is intended to be ordinal) and a power allocation of 1 (again, an ordinal designation—the power allocation can be any appropriate value chosen by the communication device) at block 814-1. All K data streams after block 814-K are summed and then transmitted by the communication device.

Figure 9:
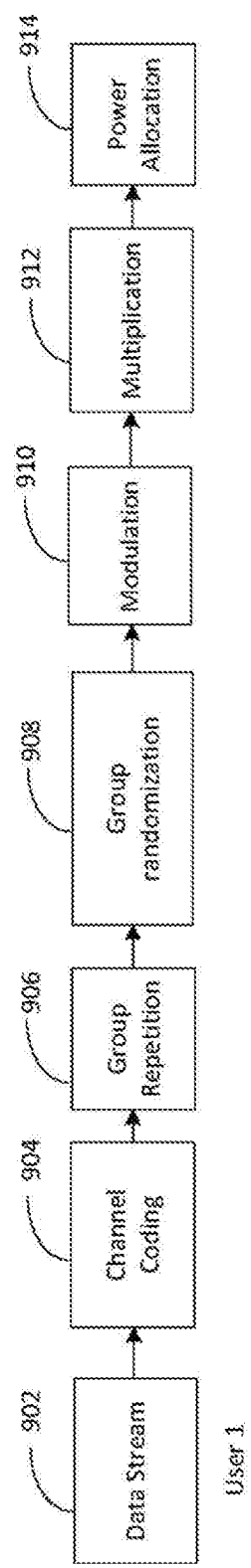

Turning to FIG. 9, an embodiment of a communication scheme in which one data stream per wireless communication device is used will now be described. In this embodiment, the data stream is encoded by channel coding. Then, group repetition is applied followed by group randomization. After modulation, multiplication is applied. The resulting signal is transmitted according to the allocated power. In particular, the communication device takes the data stream (block 902), channel codes it at block 904, carries out group repetition at block 906, carries out group randomization at block 908, carries out modulation (e.g., BPSK or QPSK) at block 910, multiplies the modulated bits by a sequence (such as values selected from {0, 1, −1, i, −i} or {1, −1, i, −i}) at block 912, and carries out power allocation at block 914.

As an example of special configuration for FIG. 9 is as follows: After channel coding, the bits [ . . . , x_i, x_{i+1}, . . . ] are repeated 4 times and the result is [ . . . , x_i, x_i, x_i, x_i, x_{i+1}, x_{i+1}, x_{i+1}, x_{i+1}, . . . ]. A group length of 1 is configured for the interleaver and scrambling is configured as [000 . . . 0]. The multiplication sequence is configured as [1,1,1, . . . , 1]. In such a case, FIG. 9 is an interleaver division multiple access (IDMA) with a repetition number of 4.

Another example of a special configuration for FIG. 9 is as follows: After channel coding, the bits [ . . . x_i x_{i+1} . . . ] are repeated 8 times and the result is [ . . . x_i x_i x_i x_i x_i x_i x_i x_i x_{i+1} x_{i+1} x_{i+1} x_{i+1} x_{i+1} x_{i+1} x_{i+1} x_{i+1} . . . ]. A group length 1 is configured for the interleaver and scrambling is configured as [000 . . . 0]. The multiplication sequence is configured as a repetition of [1, 1, 1, 1, 0, 0, 0, 0] or [0, 0, 0, 0, 1, 1, 1, 1] or [1, 0, 1, 0, 1, 0, 1, 0].

Figure 10:
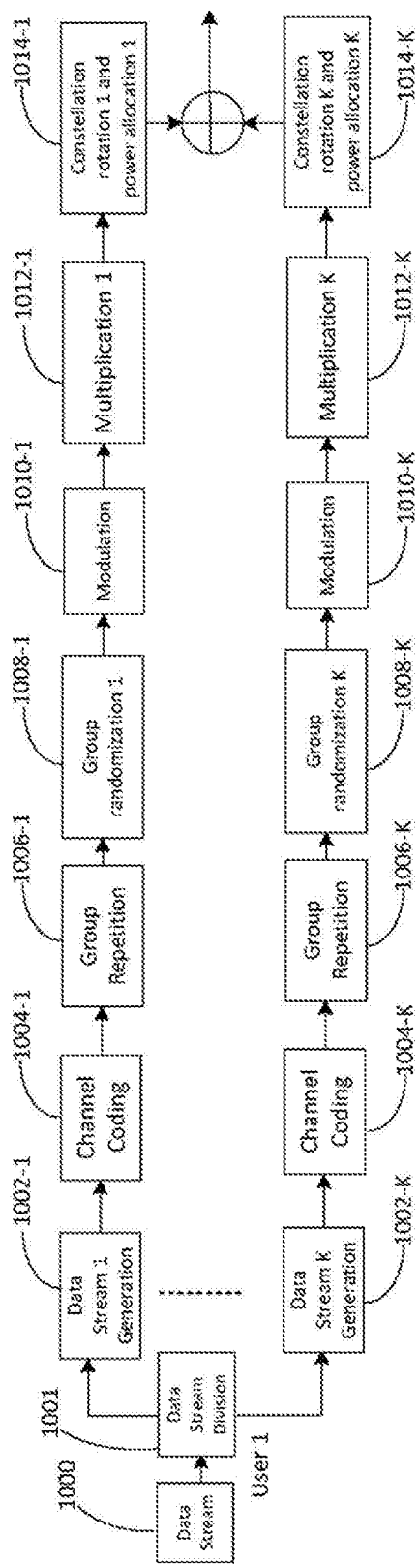

Turning to FIG. 10, another embodiment of a communication scheme in which multiple data streams per wireless communication device are used will now be described. In this embodiment, multiple data streams, which are different from one another, are transmitted. The multiplication sequence, randomization, constellation rotation and power allocation may be the same or different for each data stream. In particular, for each Kth data stream that the communication device needs to transmit at a given time, the communication device carries out the steps depicted in FIG. 9 through multiplication. The device takes the data stream 1000 and divides it at block 1001 into data streams 1002-1 through 1002-K. Using the 1st stream as an example, the device generates the first data stream (data stream 1) at block 1002-1, channel codes it at block 1004-1, carries out group repetition at block 1006-1 using repetition code 1 (the number 1 is intended to be an ordinal value signifying a first repetition code), carries out group randomization 1 at block 1008-1 (again, the number 1 is intended to be an ordinal value signifying a first randomization scheme), carries out modulation (e.g., BPSK or QPSK) at block 1010-1, multiplies the modulated bits by a sequence 1 (such as values selected from {0, 1, −1, i, −i} or {1, −1, i, −i}) (again, the number 1 is intended to be an ordinal value signifiying a first multiplication sequence) at block 1012-1, and carries out constellation rotation with a rotation factor 1 (which may be any value—the number 1 is intended to be an ordinal value) and a power allocation of 1 (again, an ordinal designation—the power allocation can be any appropriate value chosen by the communication device) at block 1014-1. All K data streams after block 1014-K are summed and then transmitted by the communication device.

Figure 11:
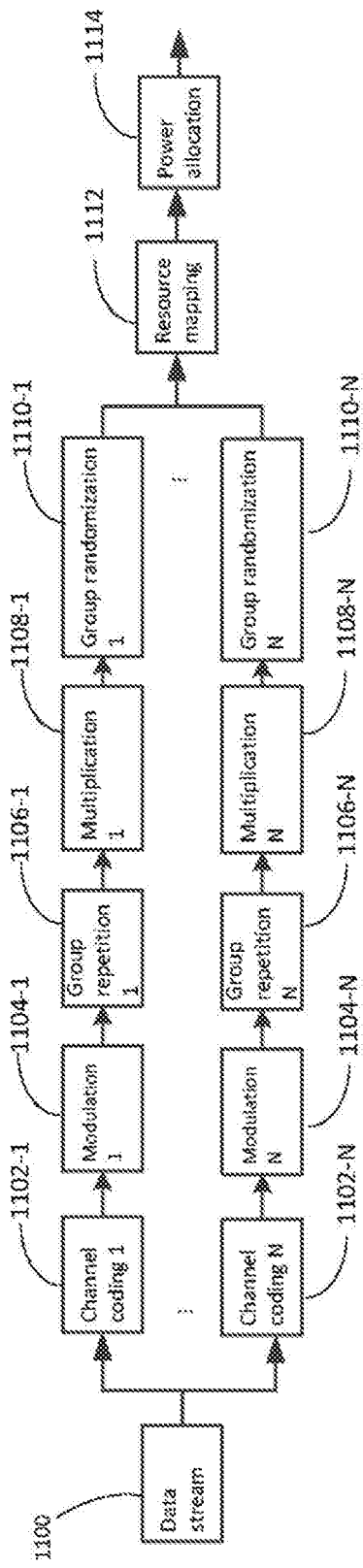

Turning to FIG. 11, another embodiment of a communication scheme in which one data stream with multiple replicas per wireless communication device are used will now be described. In this embodiment, the data stream is encoded in parallel using several channel codes. After channel coding, each channel coded data stream may have the same information bits and the same parity check bits, or different streams may have the same information bits and different parity check bits. After modulation, group repetition is applied, followed by multiplication. The same bit-to-symbol mapping for each stream or different bit-to-symbol mappings for each stream may be applied to the coded bits by the different modulation processes. Different repetition schemes can be applied to the modulated symbols in each data stream. Then, group randomization is applied followed by a resource mapping procedure that maps multiple parallel signals onto a common resource or set of resources (e.g., onto a resource block, a symbol or subcarriers). The multiplication sequences and group randomizations can be different for each parallel signal. Then, the resulting signal is transmitted according to the allocated power.

As an example of mapping multiple parallel signals onto a resource is as follows. In this example, two parallel data streams are assumed. Data stream 1 is [1, −1, −1, 1], and data stream 2 is [1, 1, −1, −1]. After the device carries out resource mapping, the result is [1, −1, −1, 1, 1, 1, −1, −1] (if data stream 1 occupies the first half of the resource) or [1, 1, −1, −1, 1, −1, −1, 1] (if data stream 2 occupies the first half of the resource).

Continuing with FIG. 11, the communication device carries out the same basic steps but with possible variations described above. At block 1102-1, the device channel codes the data stream 1100 using channel coding scheme 1. At block 1104-1, the device modulates the channel coded data stream (e.g., using BPSK or QPSK) using modulation scheme 1. At block 1106-1, the device carries out group repetition using group repetition scheme 1. At block 1108-1, the device carries out multiplication using multiplication scheme 1. At block 1110-1, the device carries out group randomization using randomization scheme 1. At block 1112, the device maps multiple parallel signals onto the resource. At block 1114, the device carries out power allocation.

As an example of a special configuration for FIG. 11 is as follows: The channel codings are configured with the same parity check bits employed, modulations with different bits-to-symbol mapping are applied. Also for this configuration, the repetition number is 4, the multiplication sequences are the repetition of [1, 0, 1, 0] or [1, 1, 0, 0], the interleaver is configured as [1, 2, 3, . . . , N], the scrambling is configured as [0, 0, 0, . . . , 0], and the power allocation is configured as full power transmission.

Figure 12:
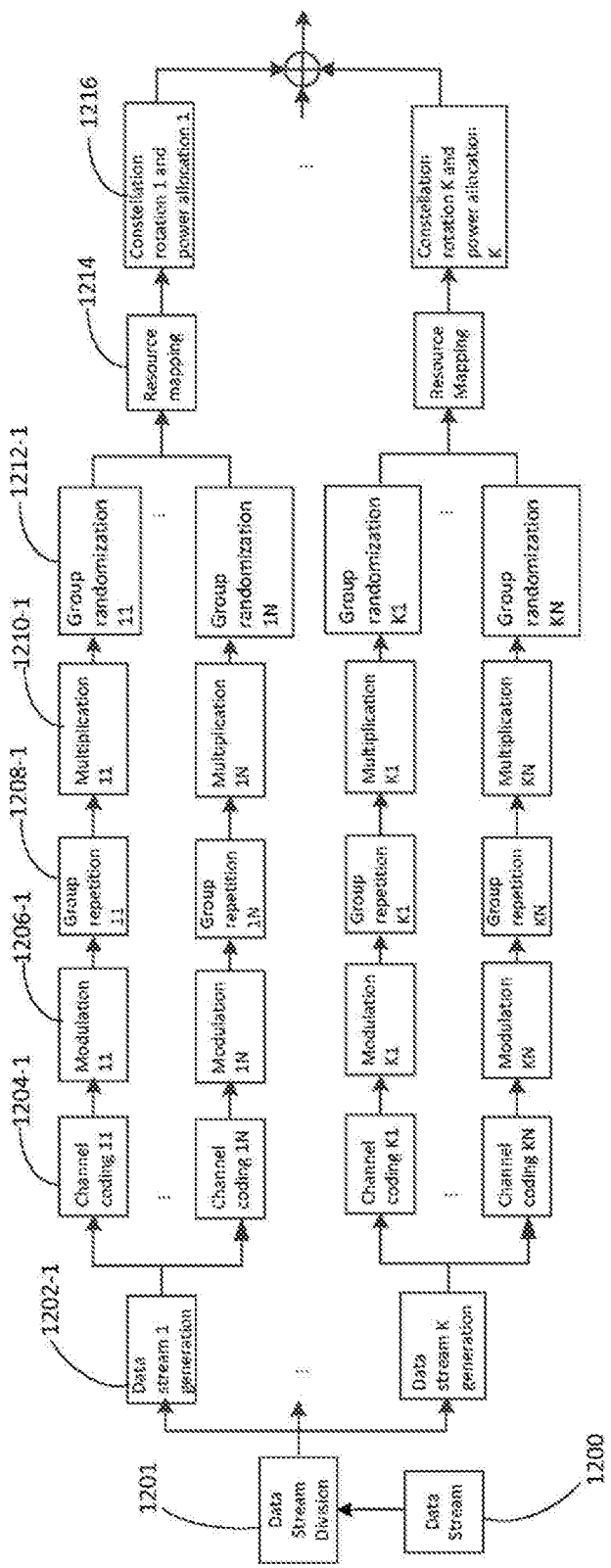

Turning to FIG. 12, another embodiment of a communication scheme in which multiple data streams per wireless communication device are used will now be described. In this embodiment, the device takes the data stream 1200 and divides it at block 1201 into data streams 1202-1 through 1202-K. In this embodiment, multiple different data streams are transmitted. The parity check bits of the channel codes, bit-to symbol mapping for the modulation, group repetition sequence, multiplication sequence, randomization, constellation rotation and power allocation may be the same or different for each data stream. In other words, for each data stream K generated at the Kth instance of block 1202, the device carries out the same procedure on each of 1 through KN sub-portion of the data steam, using these possible variations in the specific implementation. Thus, using data stream 1 as an example, the device takes data stream 1 (block 1202-1), channel codes it at block 1204-1, modulates the channel coded data stream at block 1206-1, applies group repetition to the symbols of the modulated channel coded data stream at block 1208-1, applies a multiplication scheme to the symbols at block 1210-1, and carries out group randomization on the symbols at block 1212-1. At block 1214 and the equivalent blocks in the various data streams, the device maps multiple parallel signals on the resource. At block 1216, the device carries out constellation rotation with a rotation factor 1 and a power allocation of 1 (where 1 represents an ordinal value—e.g., using the first rotation factor and the first power allocation). The device then transmits sum of all the results in a wireless signal.

Figure 13:
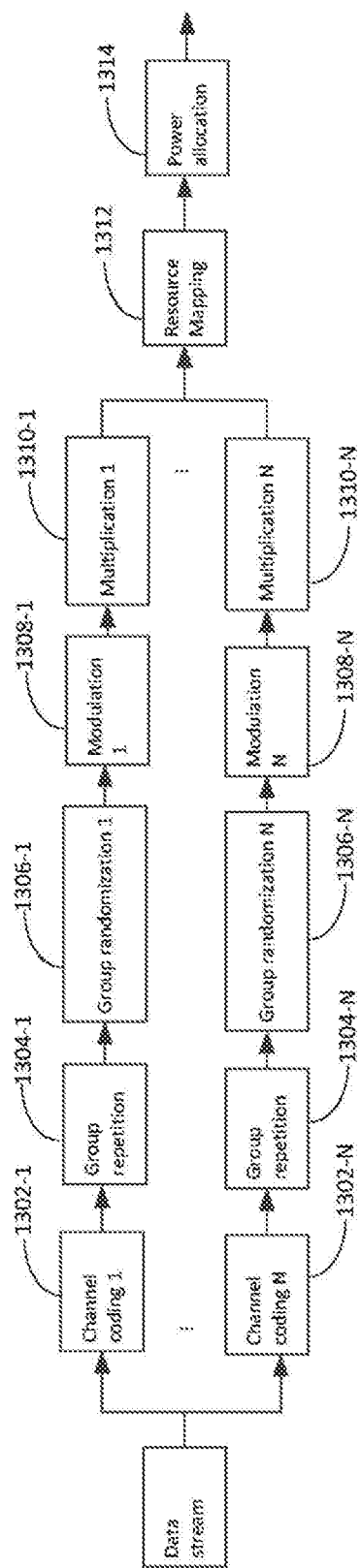

Turning to FIG. 13, another embodiment of a communication scheme in which one data stream with multiple replics per wireless communication device are used will now be described. In this embodiment, the data stream is encoded parallel by several channel codes. After channel coding, these channel coded data streams may have the same information bits and the same or different parity check bits. After group repetition, group randomization is applied, different group randomization schemes can be applied to each data stream. Then, modulation is employed followed by multiplication. The same bit-to-symbol mapping or different bit-to-symbol mappings may be used in the modulation. The multiplication sequences can also be different. A resource mapping is applied to map multiple parallel signals onto the resource. The signal is transmitted by the allocated power. In particular, for each Nth data stream that the communication device needs to transmit at a given time, the communication device carries out the same basic steps but with these possible variations.

Using the first stream as an example, at block 1302-1, the device channel codes the data stream using channel coding scheme 1. At block 1304-1, the device carries out group repetition using group repetition scheme 1. At block 1306-1, the device carries out group randomization using randomization scheme 1. At block 1308-1, the device modulates the channel coded data stream (e.g., using BPSK or QPSK) using modulation scheme 1. At block 1310-1, the device carries out multiplication using multiplication scheme 1. At block 1312, the device maps multiple parallel signals on the resource. At block 1314, the device carries out power allocation. The device then transmits the data streams in a wireless signal.

Figure 14:
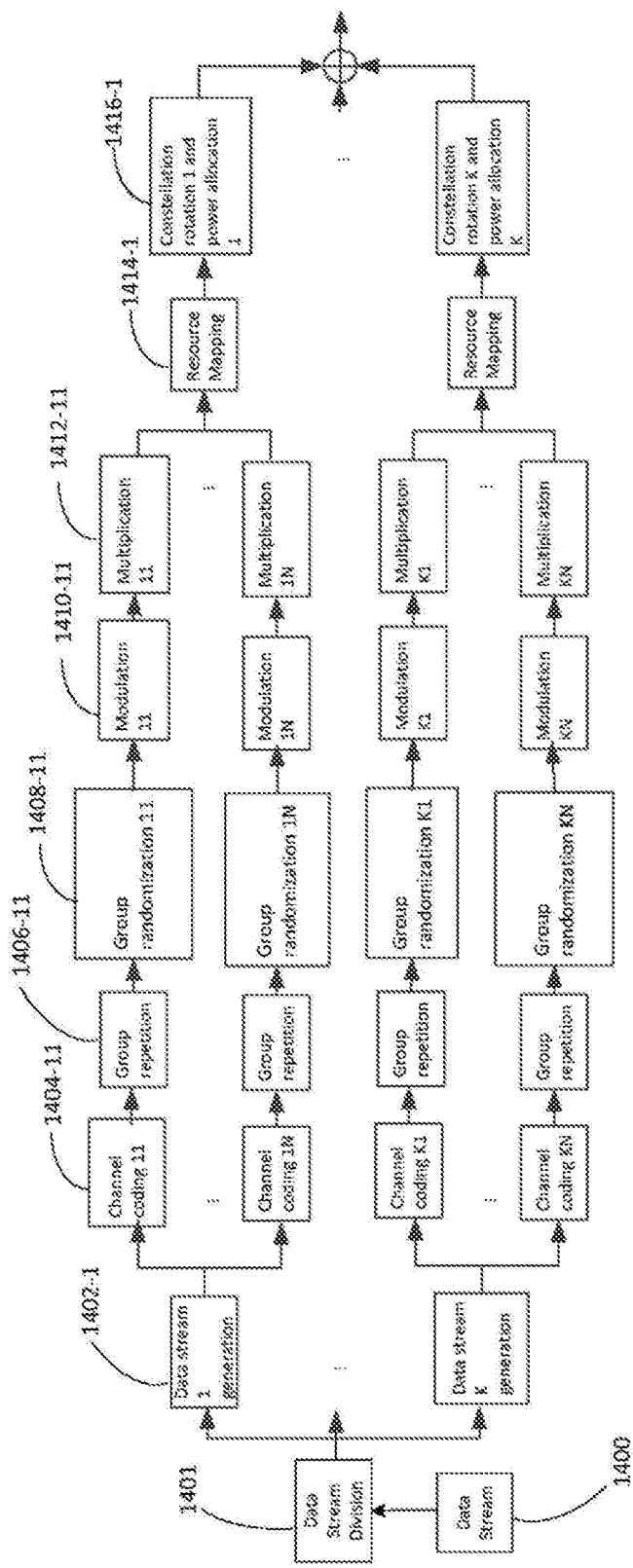

Turning to FIG. 14, another embodiment of a communication scheme in which multiple data streams per wireless communication device are used will now be described. In this embodiment, multiple data streams, which are different from one another, are transmitted. The device takes the data stream 1400 and divides it at block 1401 into data streams 1402-1 through 1402-K. The parity check bits of the channel codes, bit-to symbol mapping for the modulation, multiplication sequence, randomization, constellation rotation and power allocation may be the same or different among each data stream k. Using the first data stream as an example, the device channel codes the first sub-part of the data stream (block 1402-1) at block 1404-11. At block 1406-11, the device applies group repetition scheme 11. At block 1408-11, the device applies group randomization scheme 11. At block 1410-11, the device modulates the data stream according to modulation scheme 11. At block 1412-11, the device multiplies the data stream using multiplication scheme 11. At block 1414-1, the device maps multiple parallel signals onto the resource. At block 1416-1, the device carries out constellation rotation with a rotation factor 1 and a power allocation 1. Then, the device transmits the sum of all the data as part of a wireless signal.

In various embodiments, low code rate channel coding is used. Some practical benefits to using low code rate channel coding will now be described. In channel coding, when the same information bits and the same parity check bits are applied to different sequences of data, during modulation, the same bits map onto different symbols. Thus, at the receiver side, modulation diversity gain can be achieved due to the fact that bit-to-symbol mappings are different but the bits are the same. When the same information bits and different parity check bits are used, then only modulation diversity gain is achieved for the information bits since they are the same. The parity check bits are not the same, and therefore using different bit-to-symbol mapping does not achieve modulation diversity (although coding gain can be achieved). With different code rates and modulation order, the modulation diversity gain is larger than the coding gain in some cases. In such cases, the same information bits and the same parity check bits may be preferable.

Figure 15:
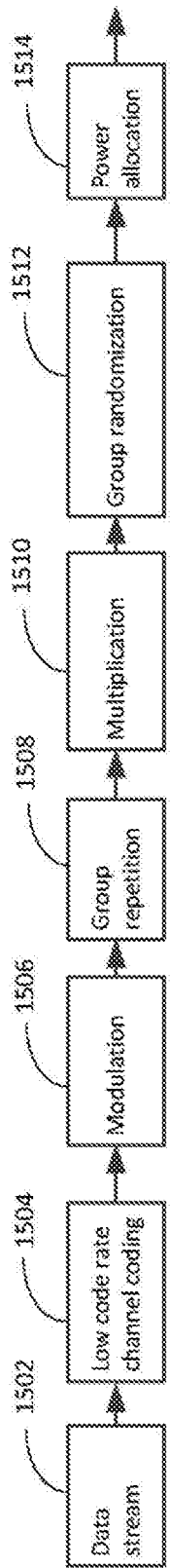

Turning to FIG. 15, another embodiment of a communication scheme in which one data stream per wireless communication device is used will now be described. In this embodiment, the data stream is encoded by low code rate channel coding. Examples of low code rate channel coding will now be described. In fourth generation (4G) networks, a turbo code is applied whose mother code rate is 1/3. Other code rates are obtained by puncturing the mother turbo code. A turbo code with a rate of 1/3 is a low code rate channel code in this context. By using rate matching, a code rate of 1/4 can be obtained. Thus, a channel code with code rate of 1/4 is also a low code rate. In fifth generation (5G) networks, low density parity check (LDPC) codes are applied and the mother code rate is 1/3 and 1/5. Thus, LPDC codes with a code rate 1/3 and 1/5 are low code rate channel codes. A channel code with a code rate lower than that of a predefined mother code is also considered to be a low code rate channel code. When the mother code has a code rate of 1/3, a code with code rate of 1/2 can be regarded as a low code rate because it is close to 1/3. When the mother code has a code rate of 1/5, a code with code rate 1/3 can also be regarded as a low code rate because it is close to 1/5.

After modulation, group repetition is applied. The signal then is multiplied with multiplication sequence. Then, group randomization is employed. The signal is then transmitted according to the allocated power. In particular, the communication device takes the data stream (block 1502), channel codes it using low code rate channel coding (i.e., employing a low code rate channel coder) at block 1504, carries out modulation (e.g., BPSK or QPSK) at block 1506, carries out group repetition at block 1506, multiplies the modulated bits by a sequence (such as values selected from {0, 1, −1, i, −i} or {1, −1, i, −i}) at block 1508, carries out group randomization at block 1510, and carries out power allocation at block 1512.

As an example of a special configuration for FIG. 15 is as follows: The multiplication sequences are [1, 1, 1, . . . , 1], the interleaver is configured as [1, 2, 3, . . . , N], and the power allocation is configured as full power transmission.

Figure 16:
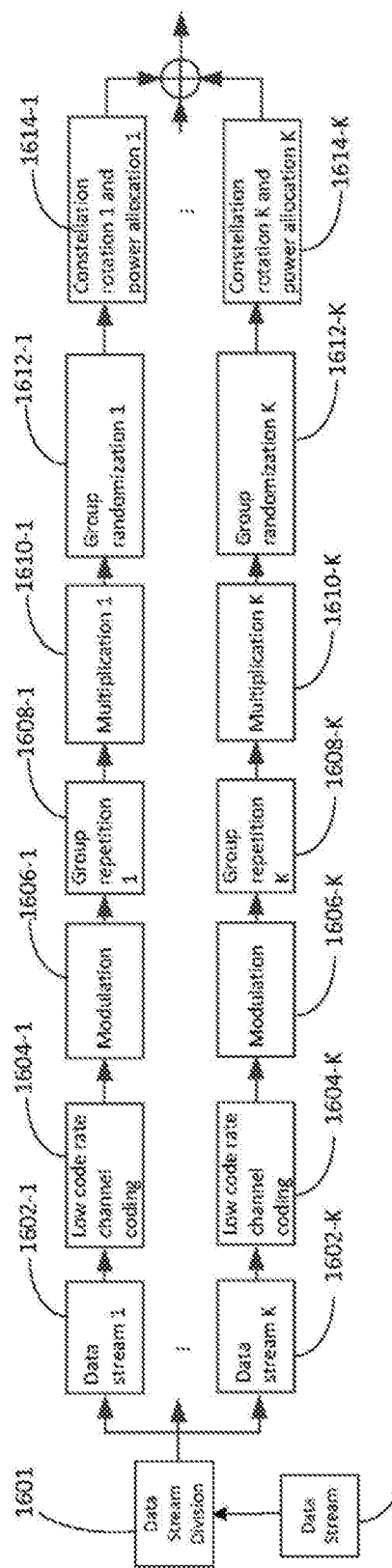

Turning to FIG. 16, another embodiment of a communication scheme in which multiple data streams per wireless communication device are used will now be described. In this embodiment, multiple data streams, which are different from one another, are transmitted. The device takes the data stream 1600 and divides it at block 1601 into data streams 1602-1 through 1602-K. The group repetition sequence, multiplication sequence, randomization, constellation rotation and power allocation may be the same or different for each data stream. In particular, for each Kth data stream that the communication device needs to transmit at a given time, the communication device carries out the steps depicted in FIG. 15 up through group randomization. Using the 1st stream as an example, the device takes the data stream (block 1602-1), channel codes it using low code rate channel coding (i.e., employing a low code rate channel coder) at block 1604-1, carries out modulation (e.g., BPSK or QPSK) at block 1606-1, carries out group repetition on the resulting symbols at block 1608-1, multiplies the symbols by a sequence 1 (such as values selected from {0, 1, −1, i, −i} or {1, −1, i, −i}) at block 1610-1, and carries out group randomization on the symbols at block 1612-1 using a particular randomization scheme (e.g., a particular interleaver or scrambler, or combinations thereof) designated by ordinal 1 in FIG. 16. The randomization scheme in this embodiment may be data stream-specific, or user-specific, or cell-specific, or combinations thereof. Thus, for example, the Kth stream uses interleaver K or scrambler K.

Continuing with FIG. 16, the communication device carries out constellation rotation with a rotation factor 1 (which may be any value—the number 1 is intended to be an ordinal value) and a power scale 1 (again, an ordinal designation—the power scale can be any appropriate value chosen by the communication device) at block 1614-1. As with multi-stream embodiments described above, all K data streams after block 1614-K are summed and then transmitted by the communication device in a wireless signal.

Figure 17:
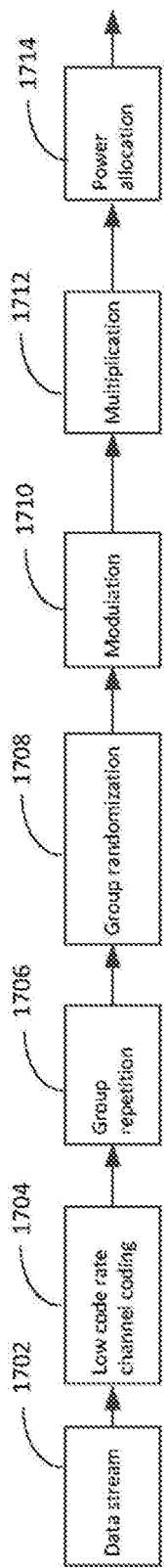

Turning to FIG. 17, another embodiment of a communication scheme in which one data stream per wireless communication device is used will now be described. In this embodiment, the data stream is encoded by low code rate channel coding. Then, group repetition is applied, followed by group randomization. After modulation, multiplication is applied. The resulting signal is transmitted according to the allocated power. In particular, the communication device takes the data stream (block 1702), channel codes it at block 1704 using low code rate channel coding (i.e., employing a low code rate channel coder), carries out group repetition at block 1706, carries out group interleaving or group scrambling at block 1708, carries out modulation (e.g., BPSK or QPSK) at block 1710, multiplies the modulated bits by a sequence (such as values selected from {0, 1, −1, i, −i} or {1, −1, i, −i}) at block 1712, and carries out power allocation at block 1714. The result is transmitted in a wireless signal.

An example of special configuration for FIG. 17 is as follows: Low code rate channel coding is obtained by repetition and rate matching, the repetition number is 1, the multiplication sequences are [1 1 1 . . . 1], and the power allocation is configured as full power transmission.

In the embodiment of FIG. 17, for example, a low code rate of 1/12 the original rate and a repetition number of 1 can be employed to achieve a coding gain (due to fact that a low code rate is being applied). As an alternative, a low code rate of 1/2 the original rate can be employed with a repetition number of 6. Or a low code rate of 1/3 the original rate can be employed with a repetition number 4. Different configurations can be used to fulfill different system requirements according to various embodiments.

Figure 18:
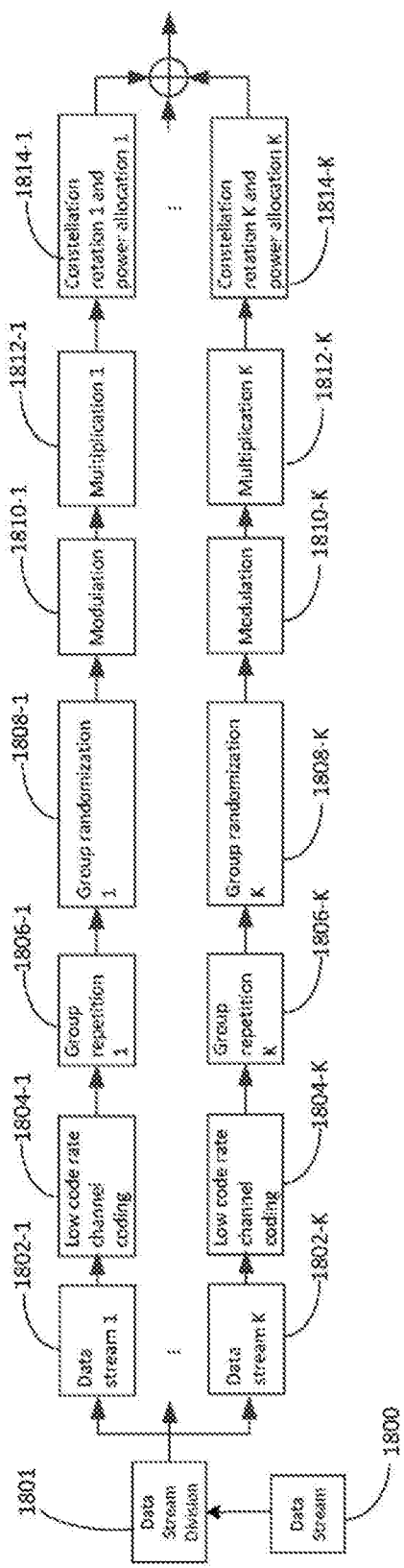

Turning to FIG. 18, another embodiment of a communication scheme in which multiple data streams per wireless communication device are used will now be described. In this embodiment, group repetition sequence, multiplication sequence, randomization, constellation rotation and power allocation may be the same or different for each data stream. In particular, for each Kth data stream that the communication device needs to transmit at a given time, the communication device carries out the steps depicted in FIG. 17 up through multiplication. The device takes the data stream 1800 and divides it at block 1801 into data streams 1802-1 through 1802-K. Using the 1st stream as an example, the device takes the data stream (block 1802-1), channel codes it at block 1804-1 using low code rate channel coding (i.e., employing a low code rate channel coder), carries out group repetition at block 1806-1, carries out group interleaving/group scrambling at block 1808-1 using interleaving scheme 1 or scrambling scheme 1, carries out modulation (e.g., BPSK or QPSK) at block 1810-1, multiplies the modulated bits by a sequence 1 (such as values selected from {0, 1, −1, i, −i} or {1, −1, i, −i}) at block 1812-1, and carries out constellation rotation with a rotation factor 1 (which may be any value—the number 1 is intended to be an ordinal value) and a power allocation of 1 (again, an ordinal designation—the power allocation can be any appropriate value chosen by the communication device) at block 1814-1. All K data streams after block 1814-K are summed and then transmitted by the communication device.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

What is claimed is:

1. A method for facilitating multiple access in a wireless network, the method comprising:
on a wireless communication device,
applying channel coding to a data stream;
applying a group repetition and a group randomization to the data stream, followed by multiplying, by a random sequence, the data stream to which the group repetition and the group randomization are applied; and
transmitting the data stream to which the group repetition, the group randomization, and the multiplying by the random sequence are applied,
wherein the group repetition includes grouping continuous bits or continuous symbols of the data stream into a group, repeating the group of the continuous bits or the continuous symbols, and multiplying the continuous bits or the continuous symbols by using a repeated sequence, wherein, in a case that the continuous symbols are multiplied, the repeated sequence has a value of 1 or −1, and in a case that the continuous bits are multiplied, the repeated sequence has a value of 1.

2. The method of claim 1, wherein the applying the channel coding to the data stream includes producing a channel coded data stream, the method further comprising:
modulating the channel coded data stream, resulting in a modulated, channel coded data stream,
wherein the group repetition, the group randomization, and the multiplying by the random sequence are performed on the modulated, channel coded data stream.

3. The method of claim 1, wherein the group repetition is applied to the data stream prior to the group randomization.

4. The method of claim 1, wherein the applying the group randomization to the data stream comprises at least one of applying a group interleaver to the data stream or carrying out group scrambling on the data stream.

5. The method of claim 4, wherein the group interleaver and the group scrambling are at least one of data stream-specific, user-specific, or cell-specific.

6. The method of claim 1, wherein the applying the group randomization to the data steam comprises:
grouping the continuous bits or the continuous symbols of the data stream into a plurality of groups of a given length; and
applying a randomizer to the plurality of groups, wherein the randomizer has a length that is inversely proportional to the given length.

7. The method of claim 1, wherein the applying the group repetition to the data stream comprises:
grouping the continuous bits or the continuous symbols of the data stream into a plurality of groups of a given length; and
applying a repetition code to the plurality of groups.

8. The method of claim 1, further comprising:
determining a transmit power according to a radio resource control signaling; and
wherein transmitting the data stream comprises transmitting the data stream according to the determined transmit power.

9. The method of claim 1, wherein the data stream is one of a plurality of data streams, and wherein the method further comprises dividing a single data stream into the plurality data streams, wherein each of the plurality of data streams is different from the others.

10. A device for wireless communication, comprising:
a logic circuit configured to process a data stream by:
applying channel coding to the data stream; and
applying a group repetition and a group randomization to the data stream, followed by multiplying, by a random sequence, the data stream to which the group repetition and the group randomization are applied; and
a transceiver coupled to the logic circuit and configured to transmit the data steam to which the group repetition, the group randomization, and the multiplying by the random sequence are applied in a wireless signal,
wherein the group repetition includes grouping continuous bits or continuous symbols of the data stream into a group, repeating the group of the continuous bits or the continuous symbols, and multiplying the continuous bits or the continuous symbols by using a repeated sequence, wherein, in a case that the continuous symbols are multiplied, the repeated sequence has a value of 1 or −1, and in a case that the continuous bits are multiplied, the repeated sequence has a value of 1.

11. The device of claim 10, wherein the logic circuit is configured to apply the channel coding to the data stream to produce a channel coded data stream by modulating the channel coded data stream to produce a modulated, channel coded data stream,
wherein the group repetition, the group randomization, and the multiplying by the random sequence are performed on the modulated, channel coded data stream.

12. The device of claim 10, wherein the group repetition is applied to the data stream prior to the group randomization.

13. The device of claim 10, wherein the logic circuit is configured to apply the group randomization to the data stream by applying a group interleaver to the data stream or carrying out group scrambling on the data stream.

14. The device of claim 10, wherein the logic circuit is configured to apply the group repetition to the data stream by:
grouping the continuous bits or the continuous symbols of the data stream into a plurality of groups of a given length; and
applying a repetition code to the plurality of groups.

15. The device of claim 13, wherein the group interleaver and the group scrambling are at least one of data stream-specific, user-specific, or cell-specific.

16. The device of claim 10, wherein the applying the group randomization to the data stream comprises:
applying a randomizer to a plurality of groups, wherein the randomizer has a length that is inversely proportional to a given length.

17. The device of claim 10, wherein the transceiver is configured to transmit the data stream according to a transmit power determined according to a radio resource control signaling.

18. The device of claim 10, wherein the data stream is one of a plurality of data streams, wherein a single data stream is divided into the plurality data streams, and wherein each of the plurality of data streams is different from the others.

* * * * *